United States Patent
Keum et al.

(10) Patent No.: US 12,455,449 B2
(45) Date of Patent: Oct. 28, 2025

(54) DISPLAY DEVICE

(71) Applicant: LG ELECTRONICS INC., Seoul (KR)

(72) Inventors: Kitae Keum, Seoul (KR); Junseok Tak, Seoul (KR); Hyongil Kil, Seoul (KR); Minook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/849,390

(22) PCT Filed: Mar. 23, 2022

(86) PCT No.: PCT/KR2022/004091
§ 371 (c)(1),
(2) Date: Sep. 20, 2024

(87) PCT Pub. No.: WO2023/182545
PCT Pub. Date: Sep. 28, 2023

(65) Prior Publication Data
US 2025/0199308 A1    Jun. 19, 2025

(51) Int. Cl.
*G09G 3/3233* (2016.01)
*G02B 27/01* (2006.01)

(52) U.S. Cl.
CPC ..... *G02B 27/0149* (2013.01); *G02B 27/0101* (2013.01); *G09G 3/3233* (2013.01); *G02B 2027/0154* (2013.01); *G09G 2300/0842* (2013.01); *G09G 2320/0626* (2013.01); *G09G 2320/066* (2013.01)

(58) Field of Classification Search
CPC ............ G02B 27/0101; G02B 27/0149; G02B 2027/0154; G09G 3/3233; G09G 2300/0842; G09G 2320/0626; G09G 2320/066
See application file for complete search history.

(56) References Cited

FOREIGN PATENT DOCUMENTS

| JP | 2007-534021 A | 11/2007 | | |
|---|---|---|---|---|
| KR | 10-1361988 B1 | 2/2014 | | |
| KR | 10-2015-0002032 A | 1/2015 | | |
| KR | 10-2017-0089113 A | 8/2017 | | |
| KR | 20170089113 A | * 8/2017 | ........... | G02F 1/1333 |
| KR | 10-2021-0094933 A | 7/2021 | | |
| KR | 20210094933 A | * 7/2021 | ........... | H10H 29/142 |

\* cited by examiner

*Primary Examiner* — Cory A Almeida
(74) *Attorney, Agent, or Firm* — Birch, Stewart, Kolasch & Birch, LLP

(57) ABSTRACT

Disclosed is a display device. The display device of the present disclosure may include: a display panel having a light emitting region and a transparent region; a plurality of plates positioned behind the display panel, extending in a first direction, and sequentially arranged in a second direction; and a side frame extending along a periphery of the display panel and to which each of the plurality of plates is coupled so as to be rotatable about a rotation axis that is parallel to the first direction, wherein the plurality of plates sequentially rotate in the second direction and open or close a rear of the display panel, wherein the plurality of plates may include: a first plate; and a second plate spaced apart from the first plate in the second direction, wherein a start point of rotation of the second plate may be before an end point of rotation of the first plate.

13 Claims, 44 Drawing Sheets

[FIG. 1]
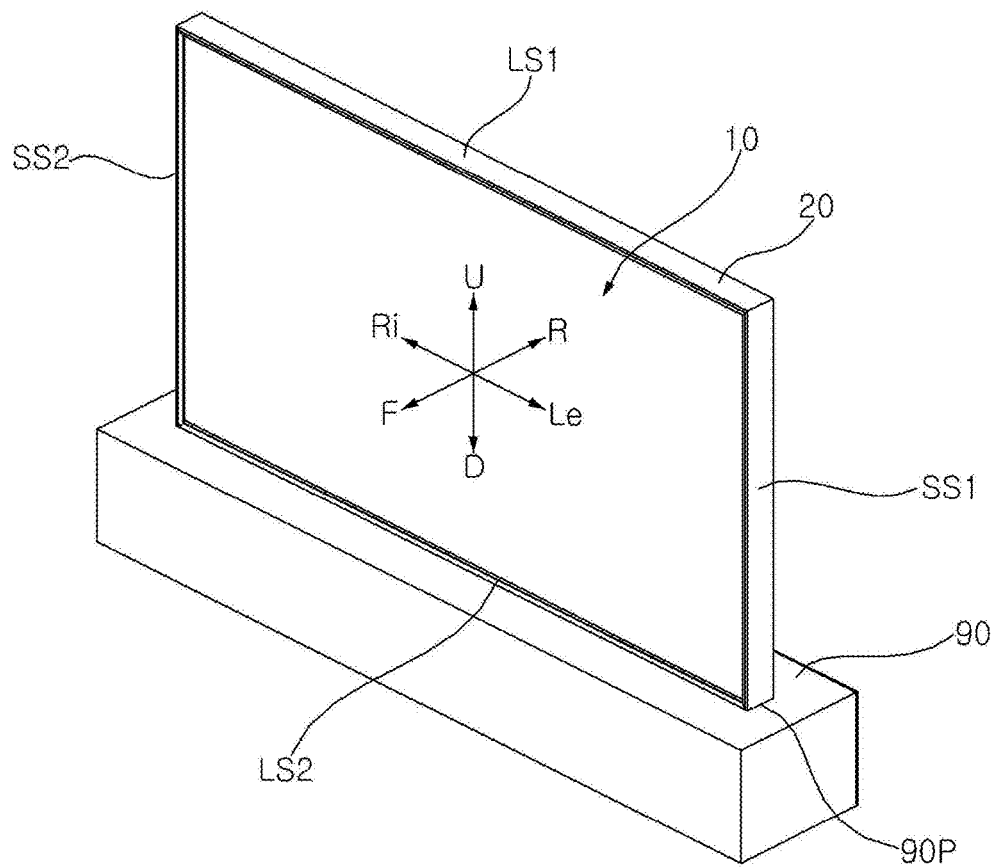

[FIG. 2]
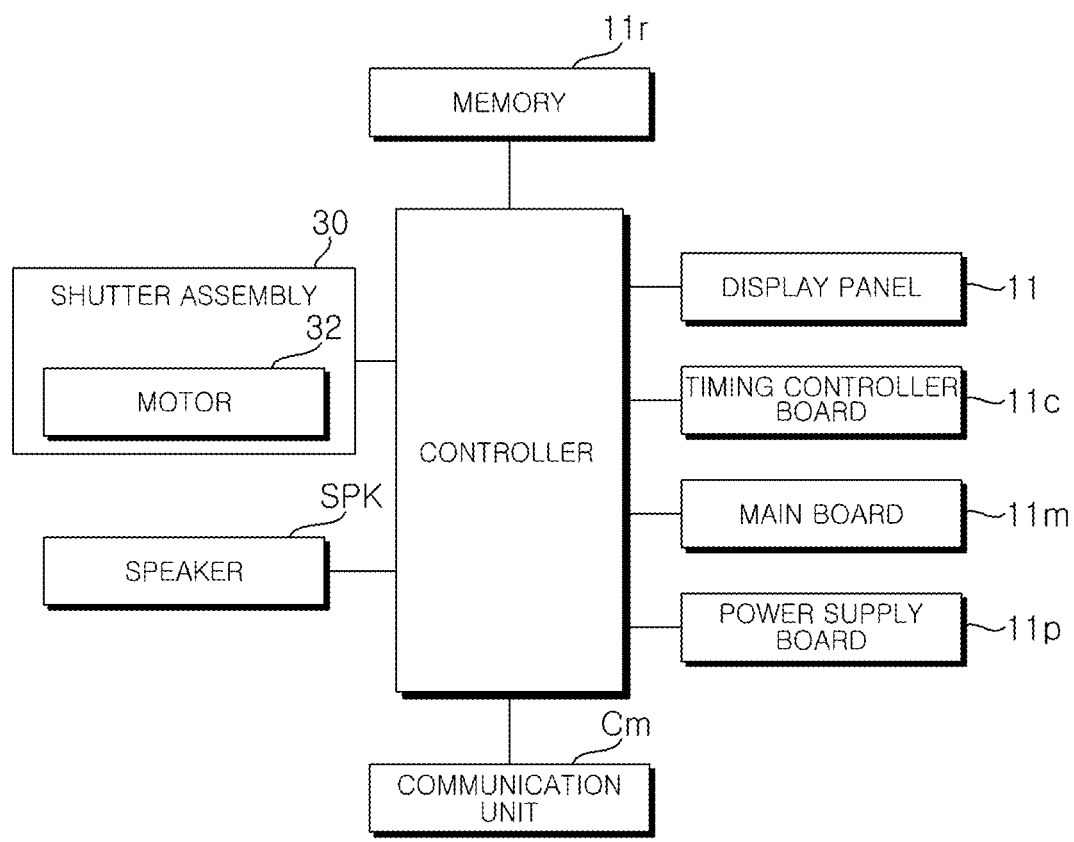

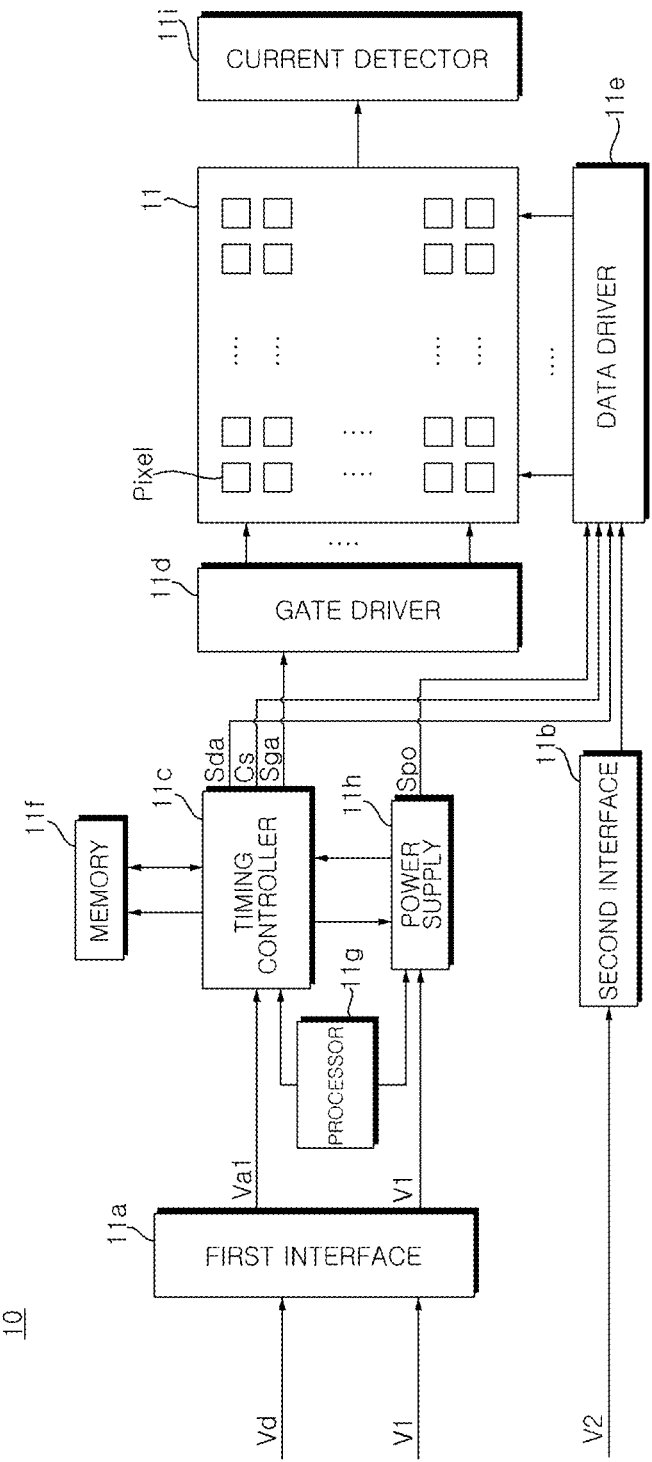

[FIG. 4]
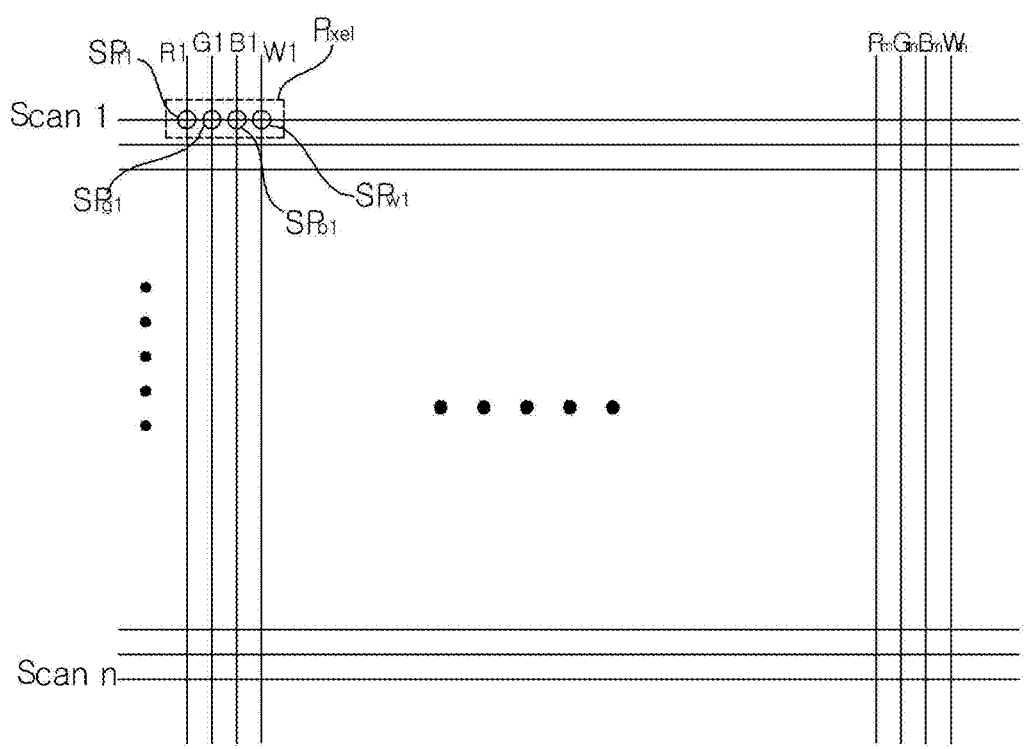

[FIG. 5]
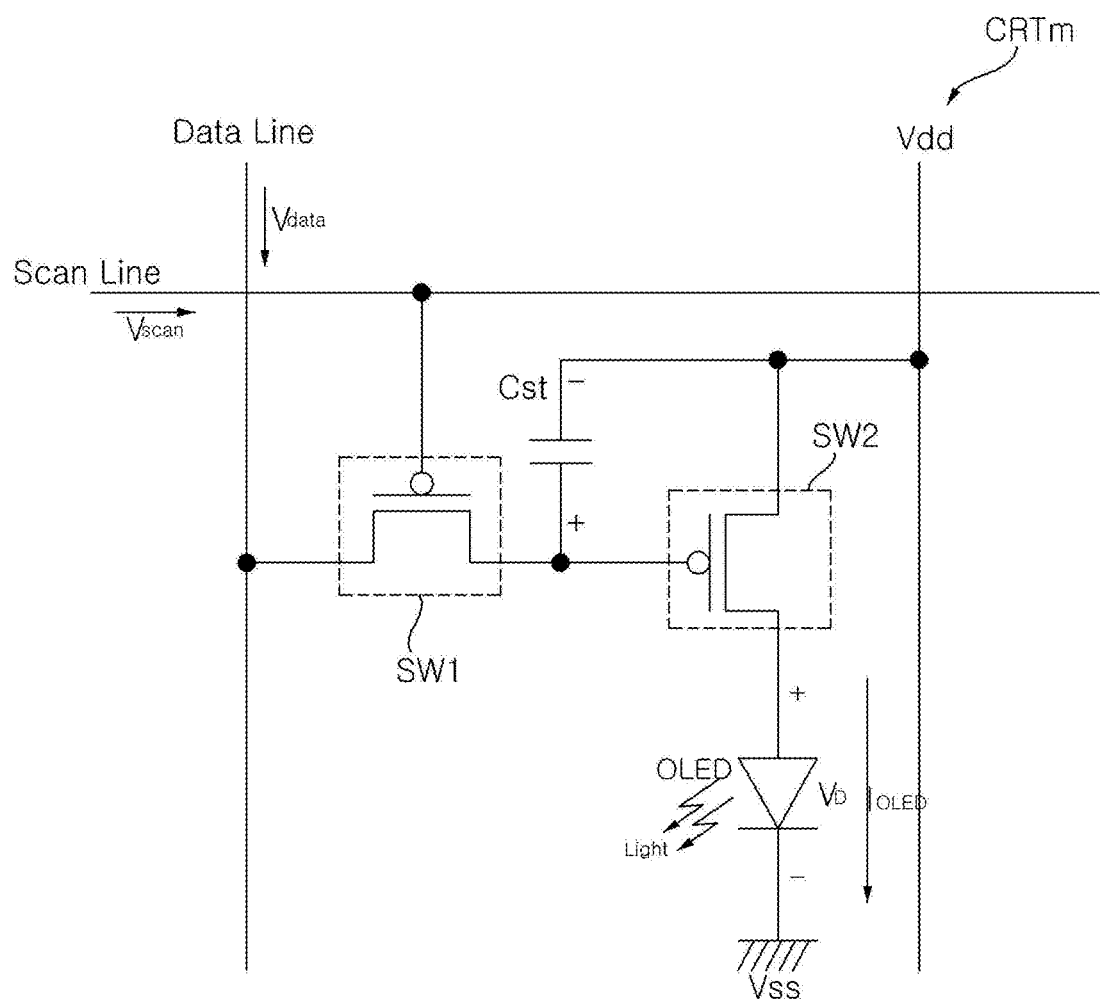

[FIG. 6]
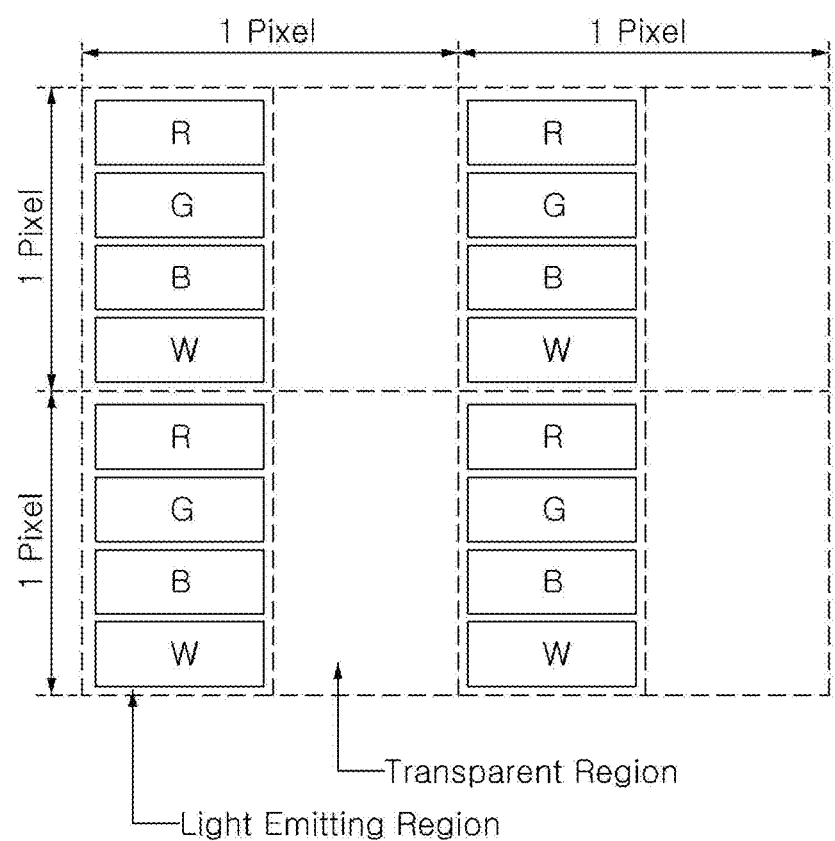

[FIG. 7]
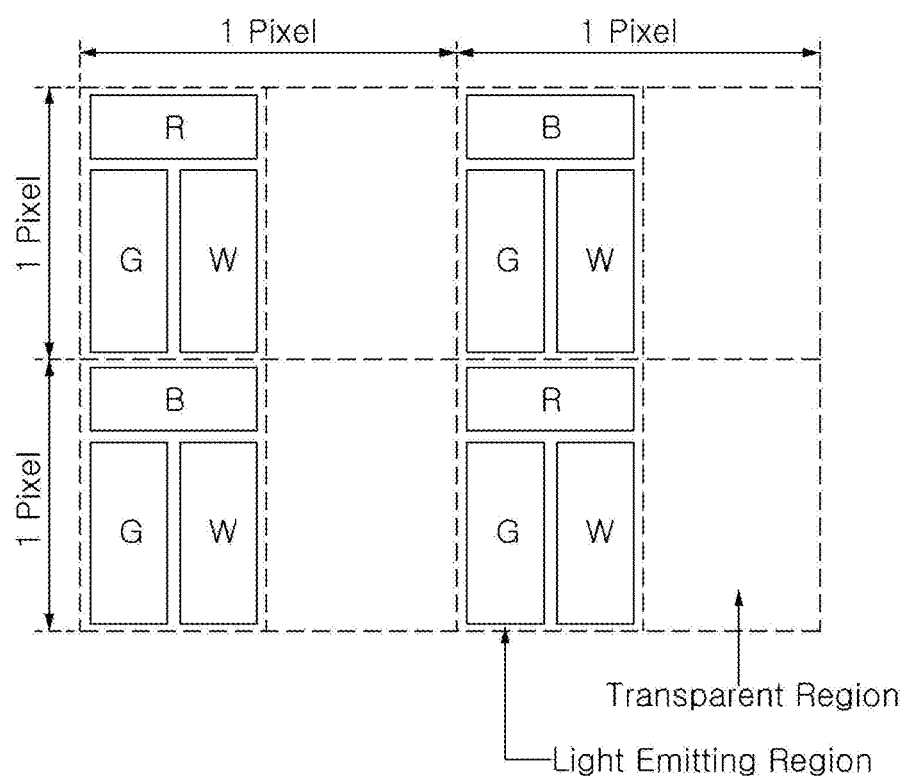

[FIG. 8]
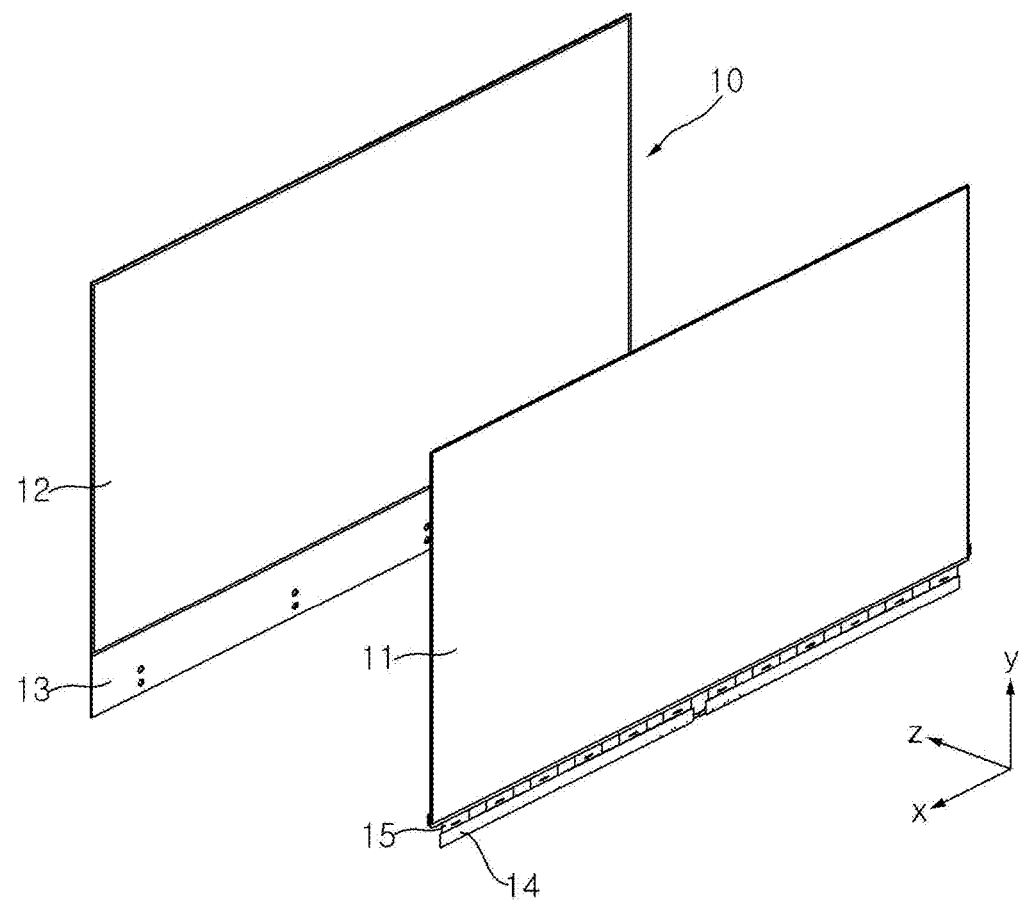

[FIG. 9]
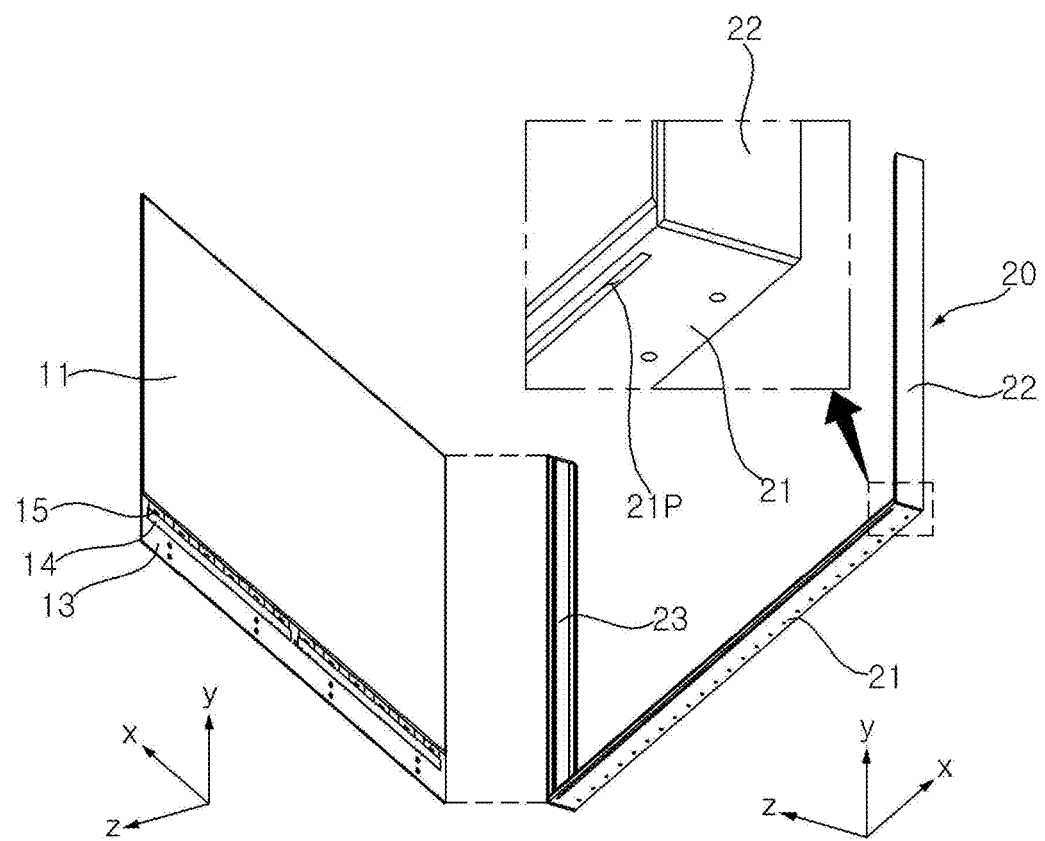

[FIG. 10]
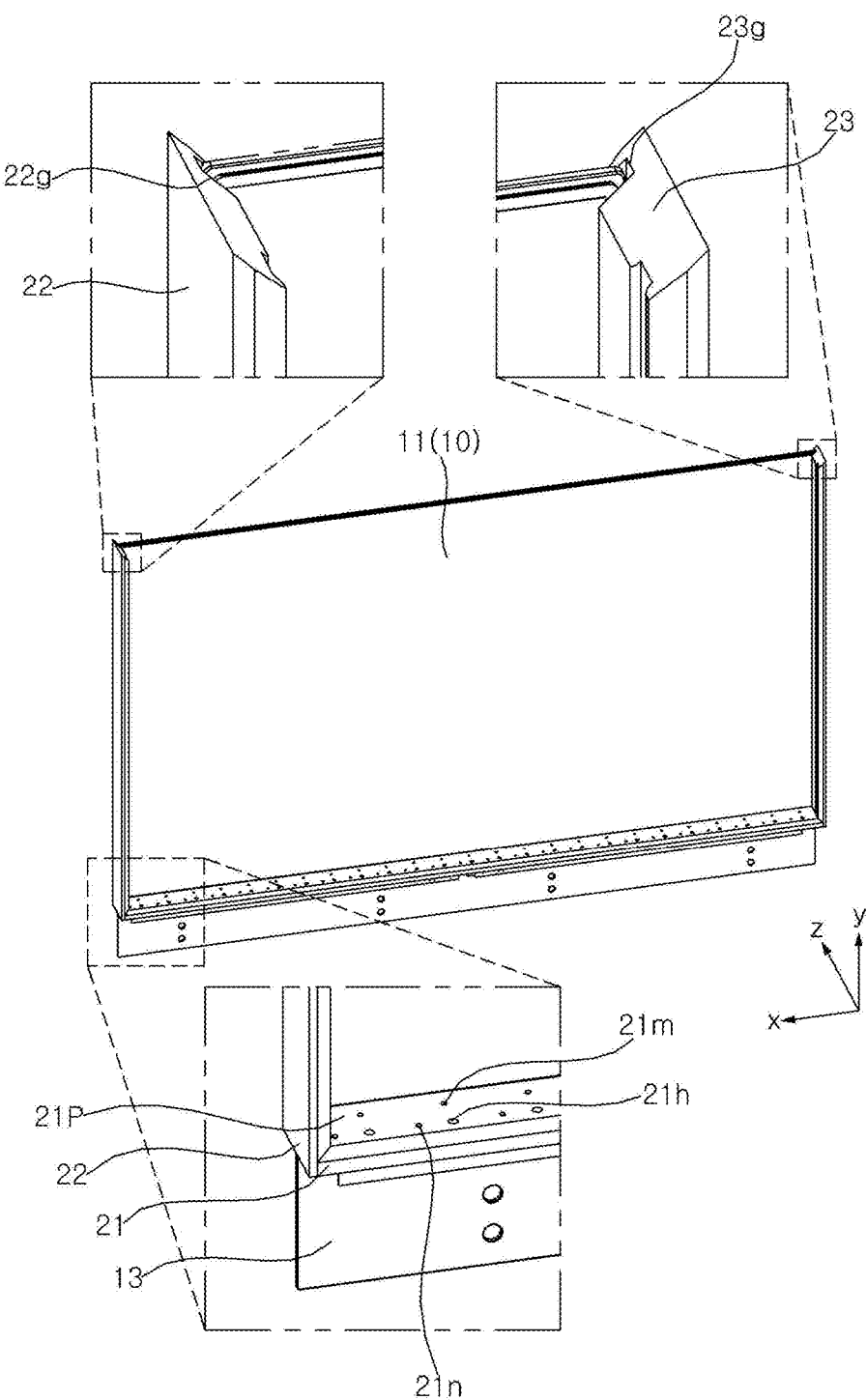

[FIG. 11]
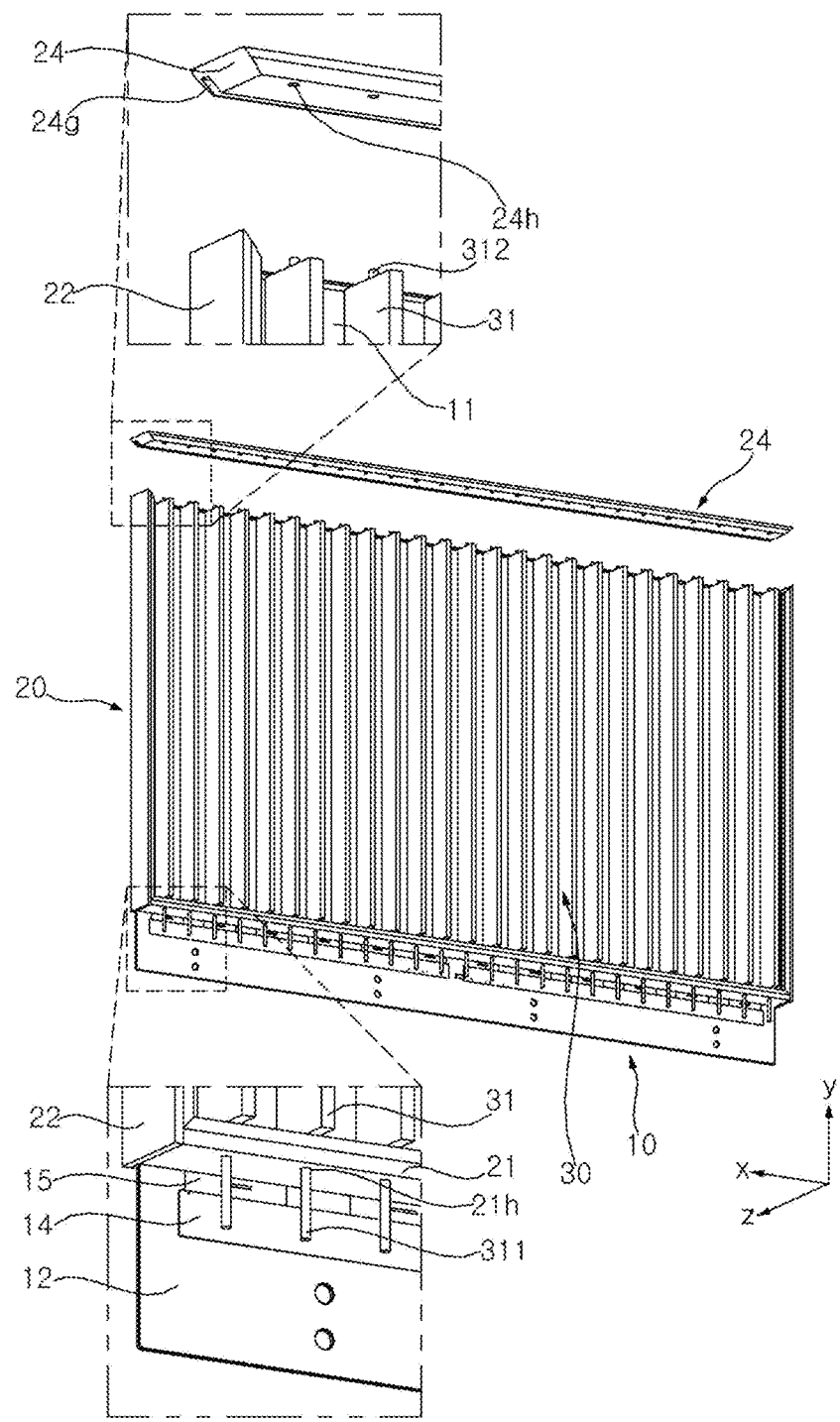

[FIG. 12]
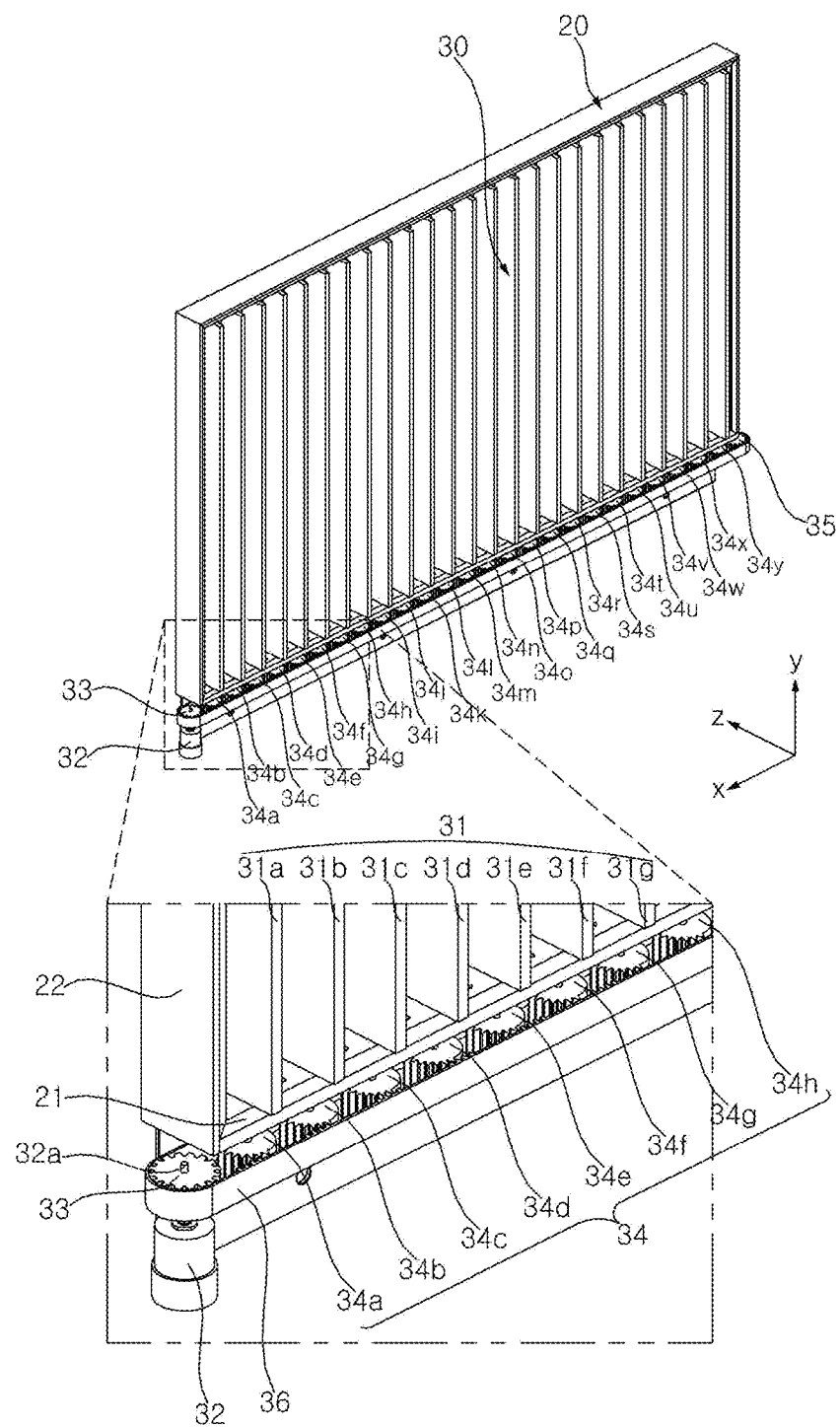

[FIG. 13]
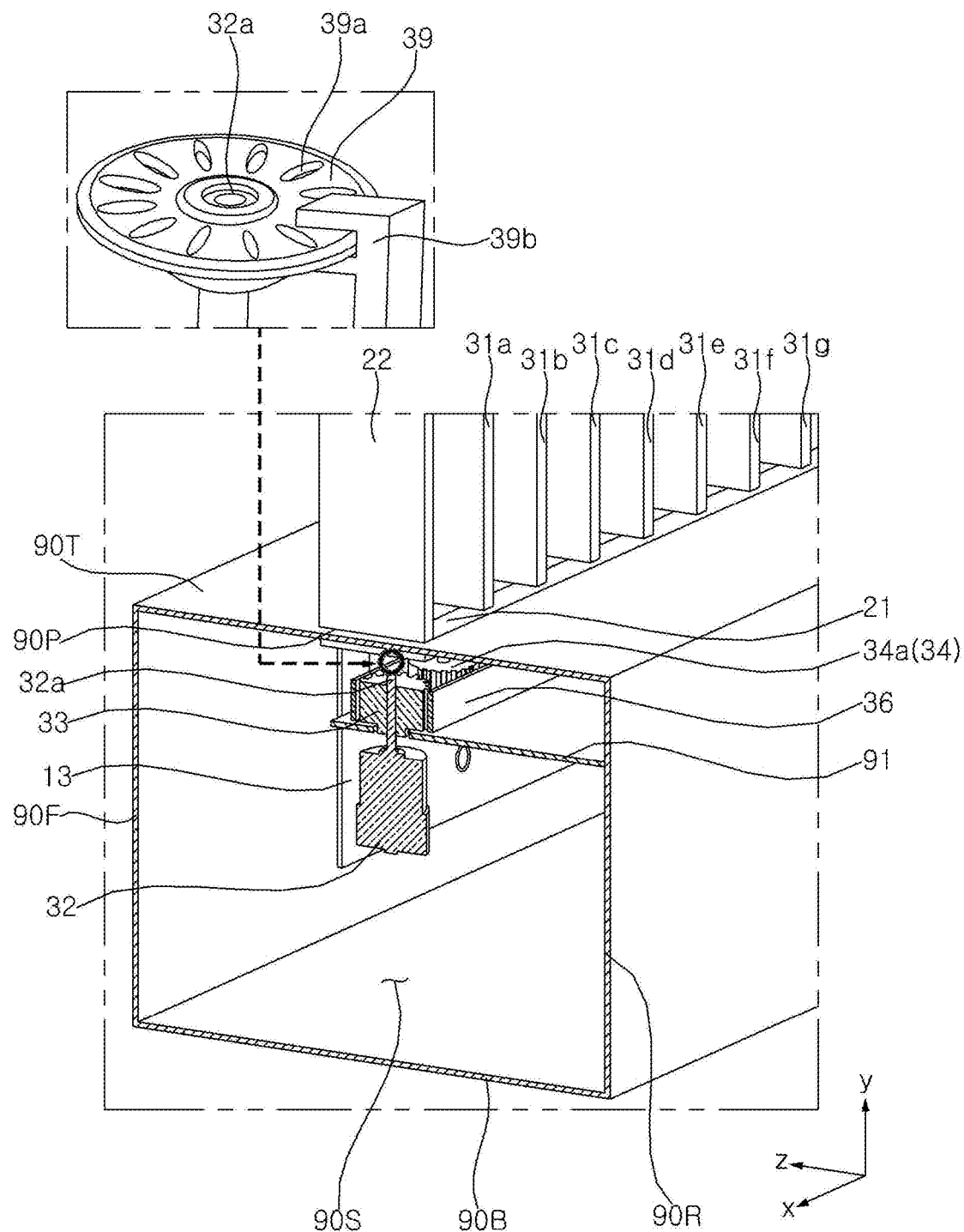

[FIG. 14]
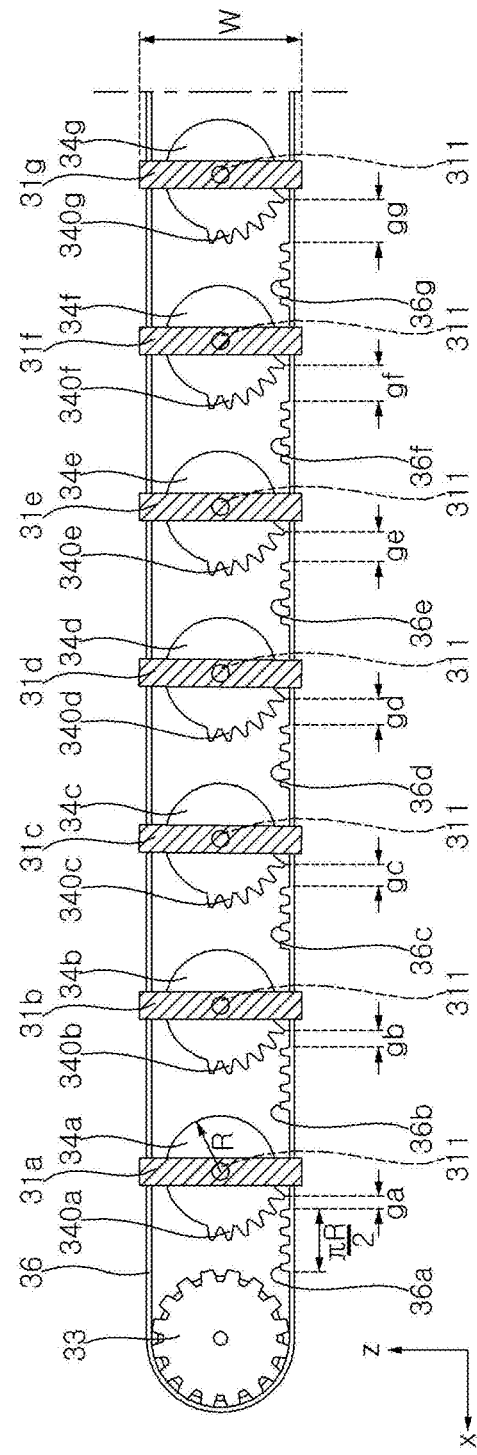

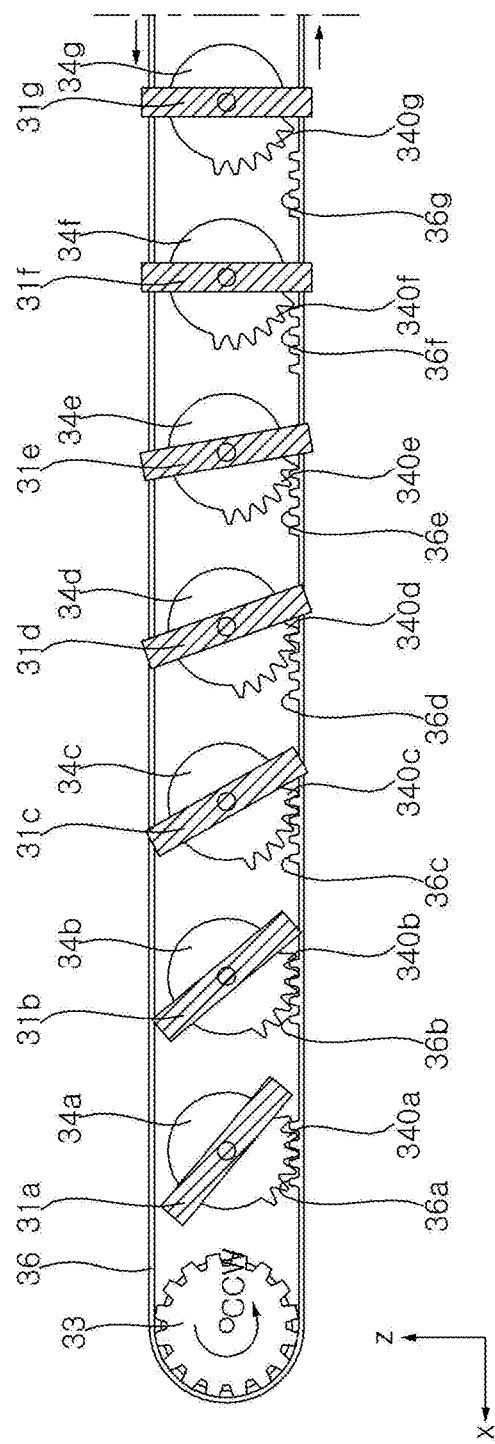
[FIG. 15]

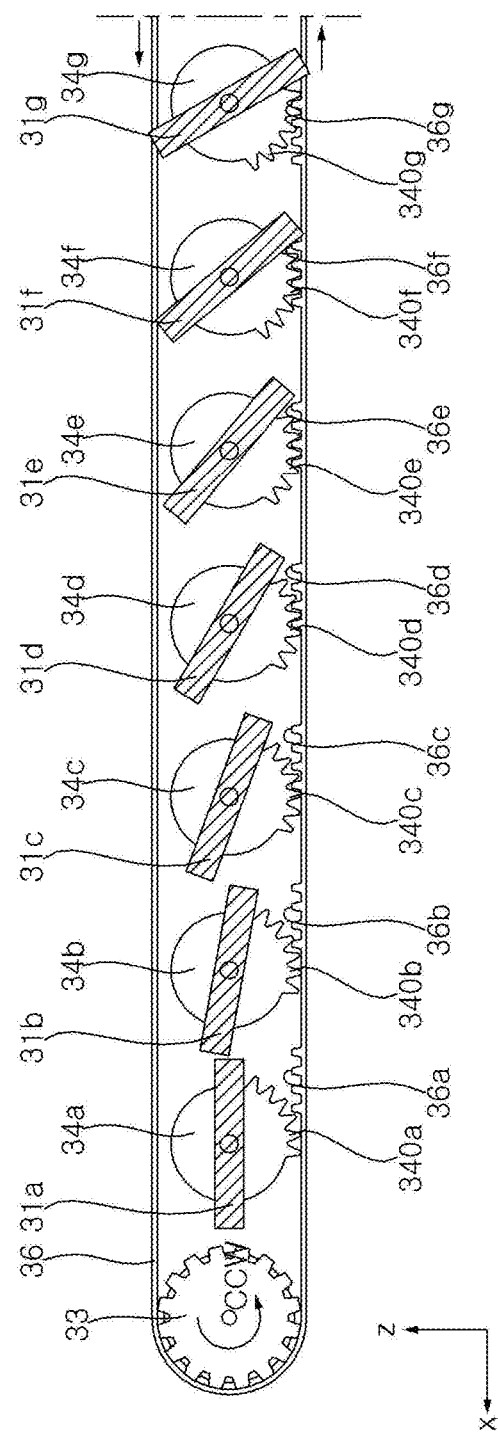
[FIG. 16]

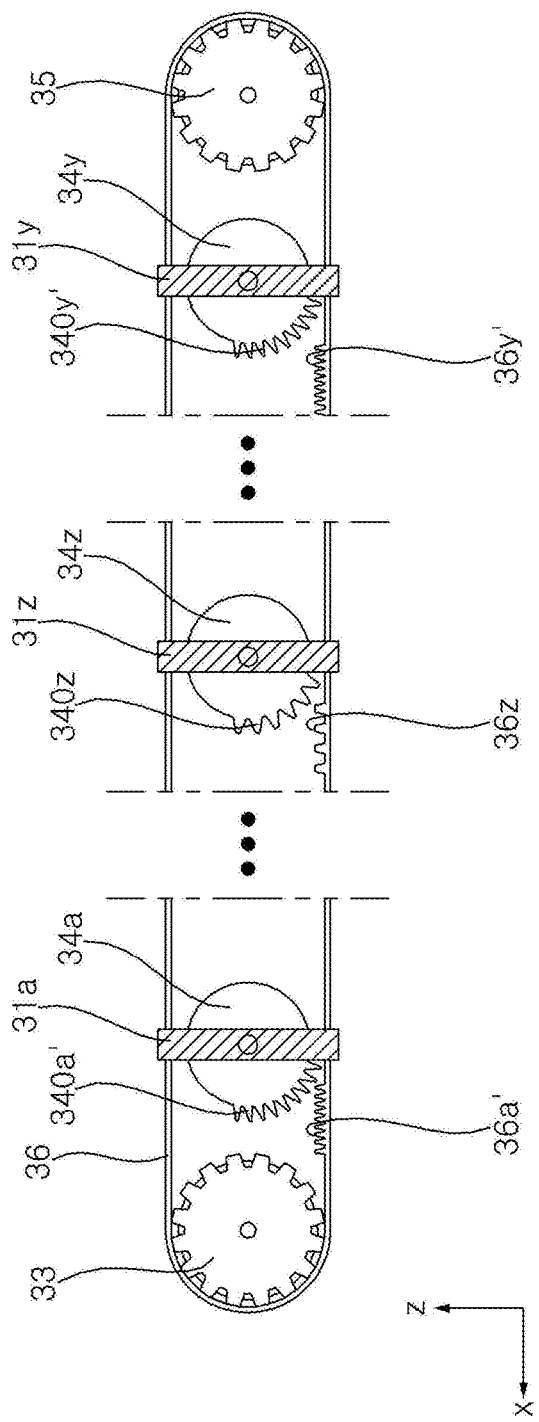
[FIG. 17]

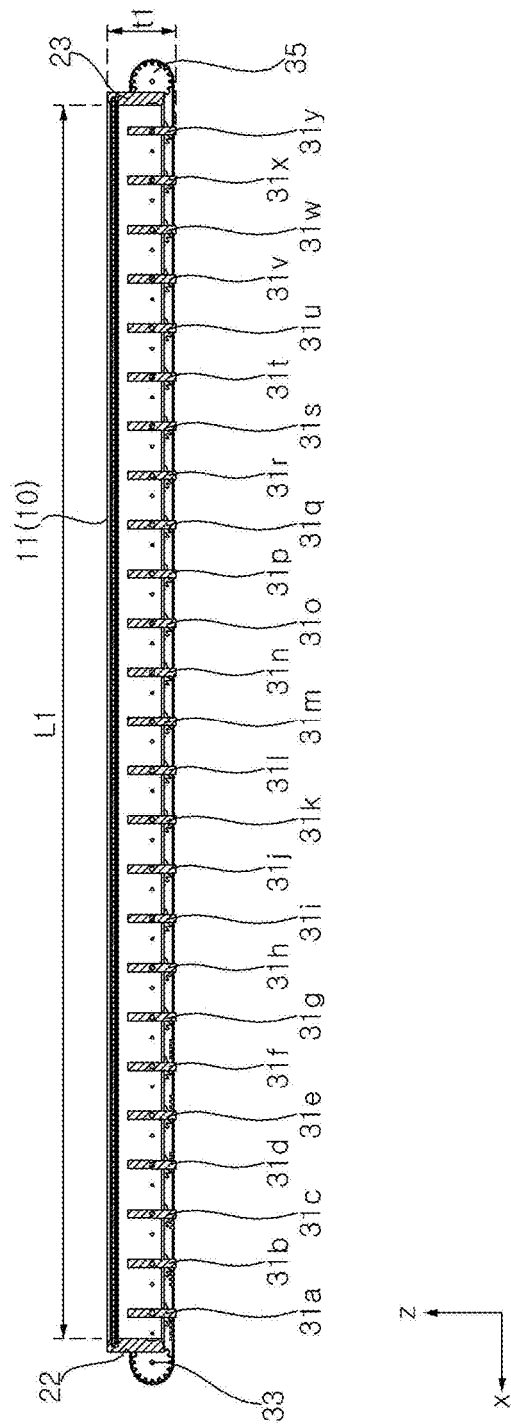
[FIG. 18]

[FIG. 19]
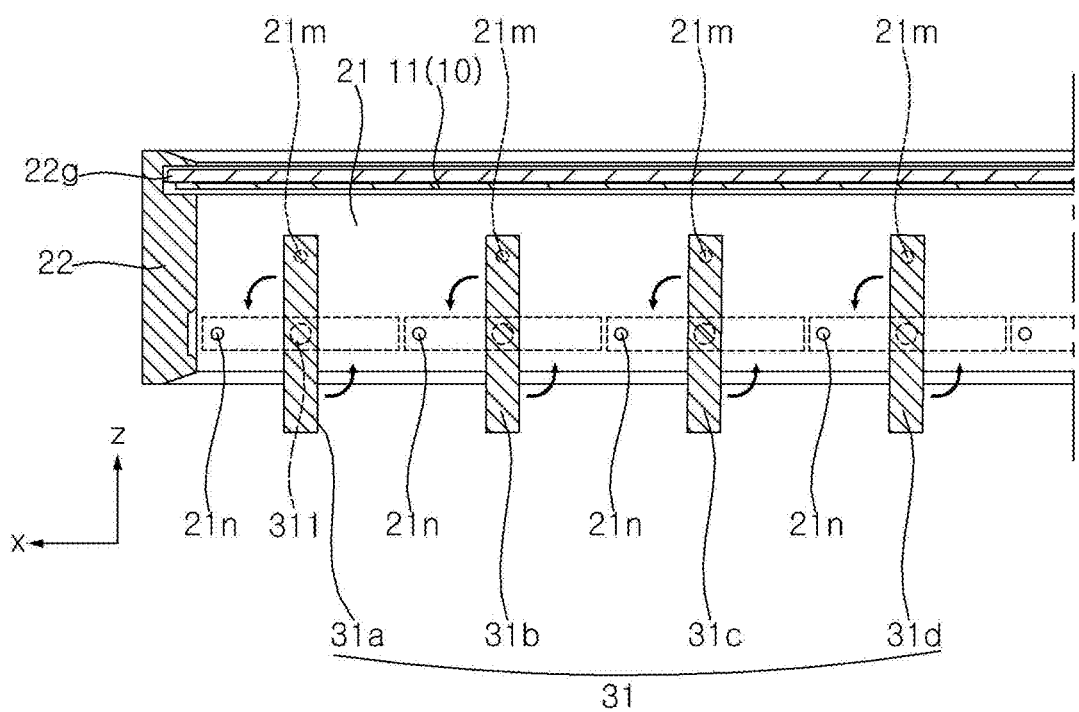

[FIG. 20]
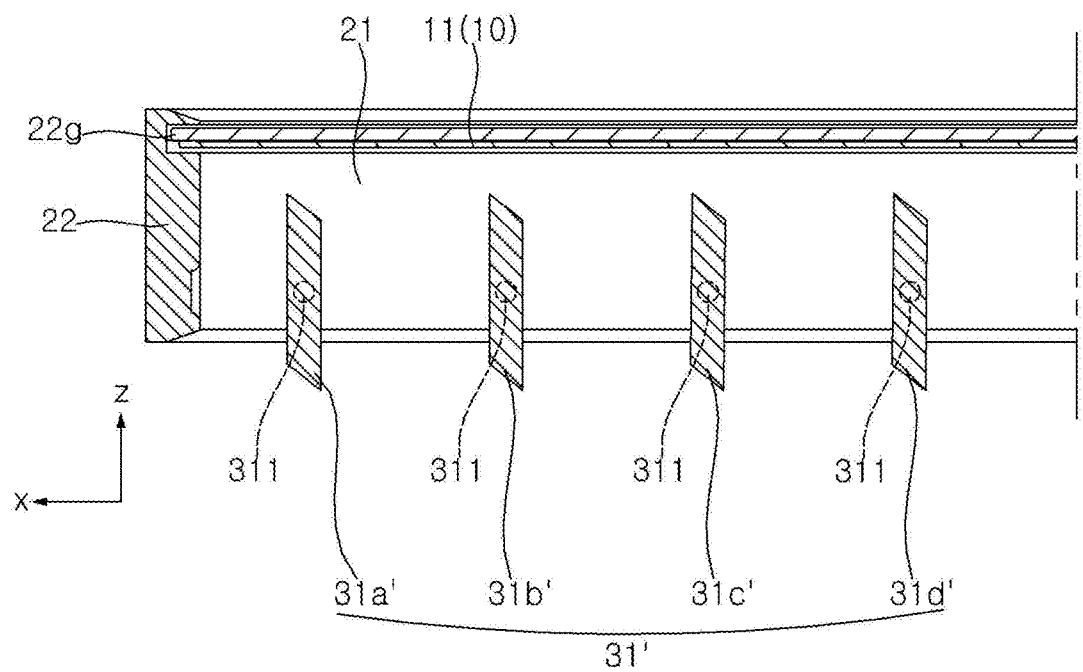

[FIG. 21]
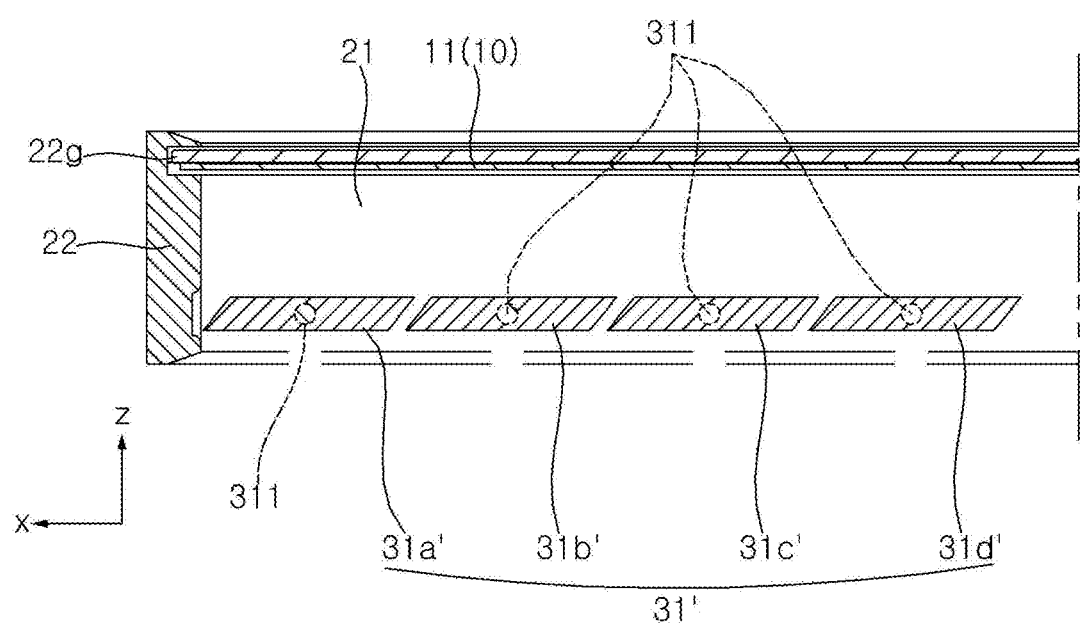

[FIG. 22]
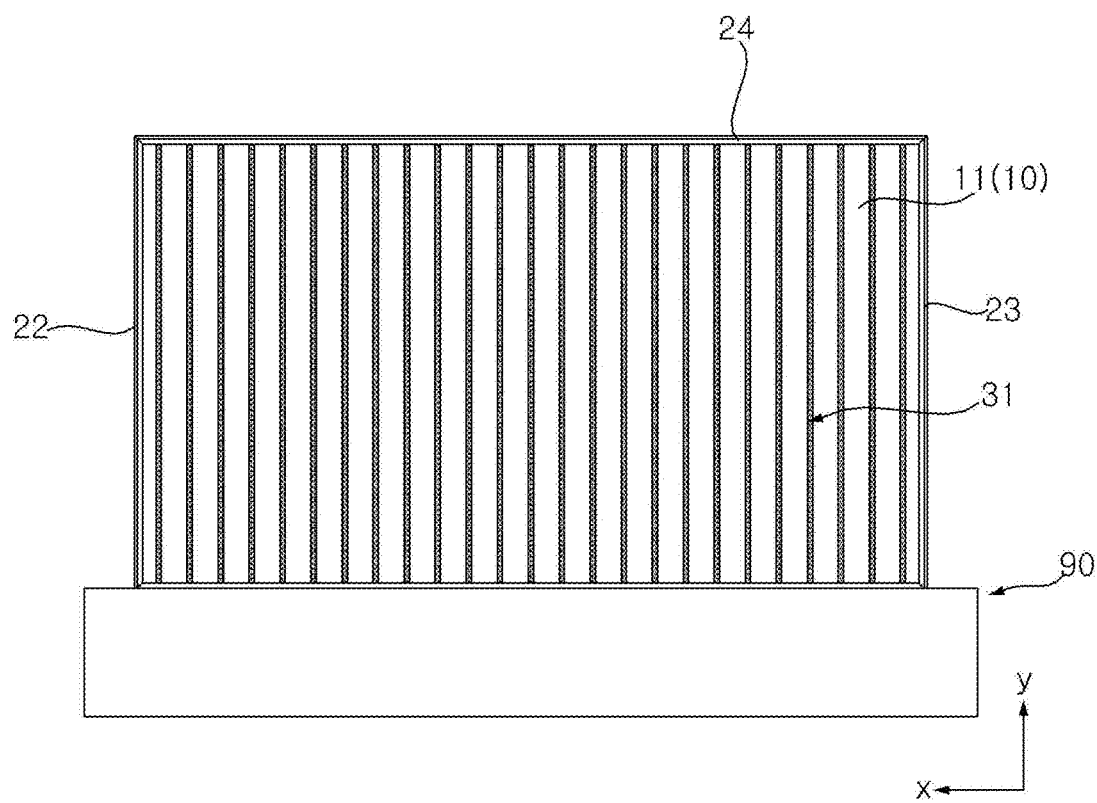

[FIG. 23]
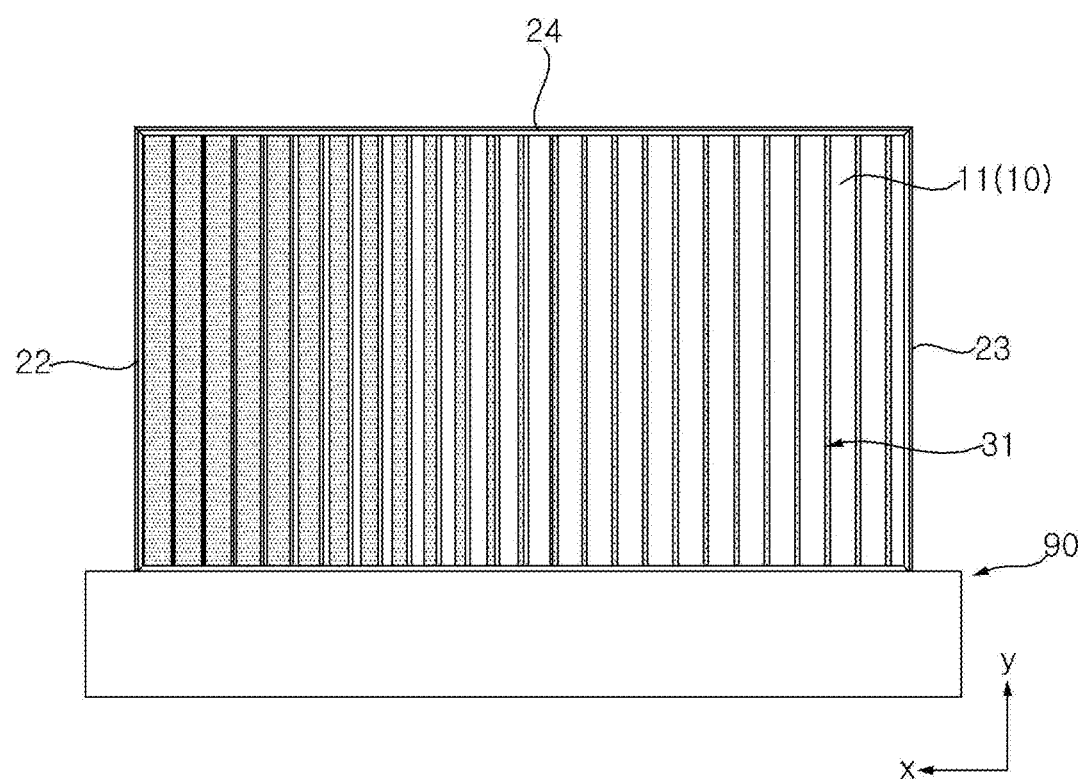

[FIG. 24]
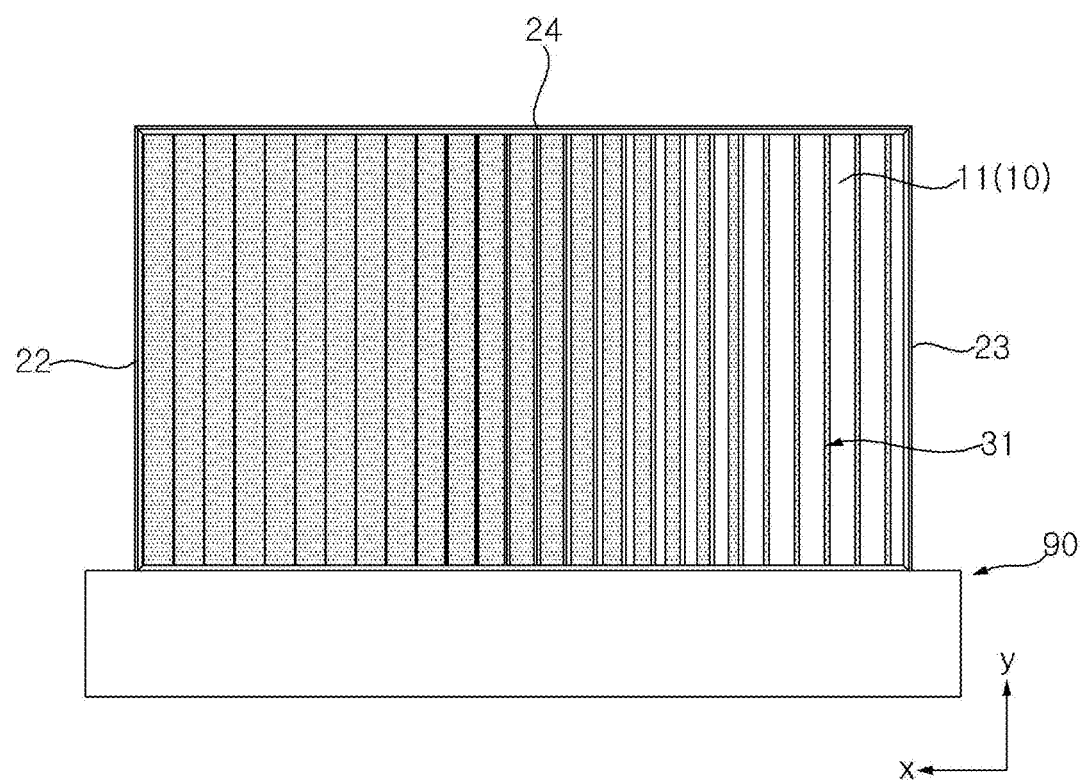

[FIG. 25]
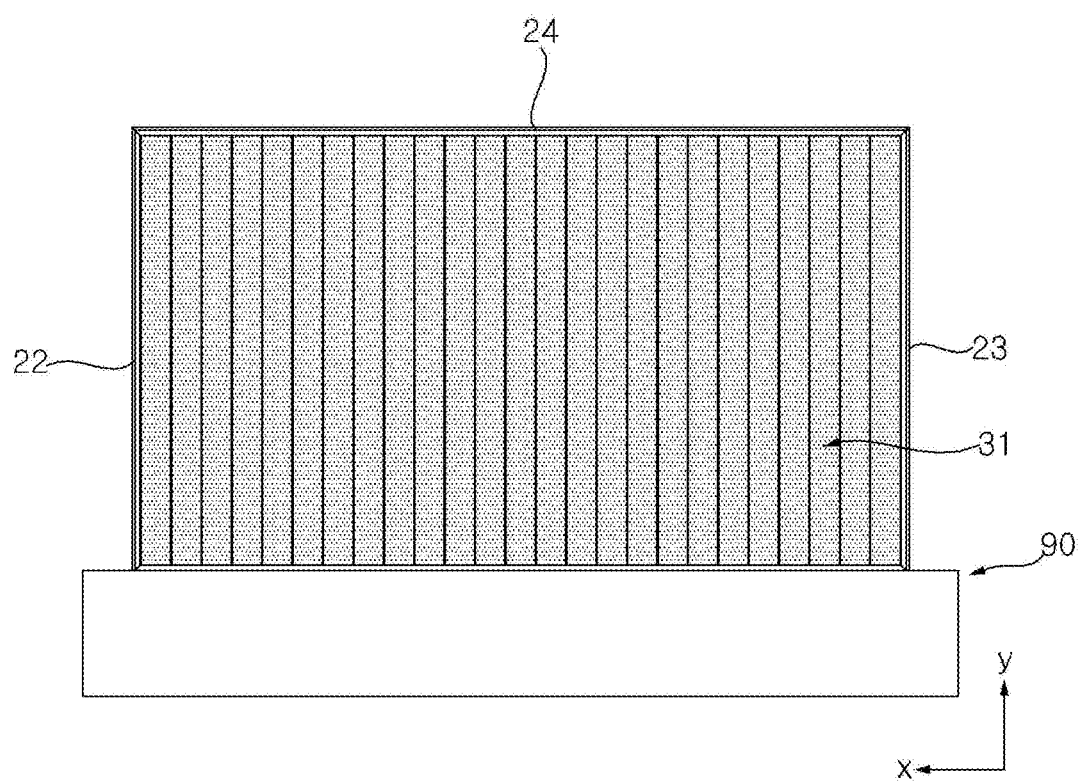

[FIG. 26]
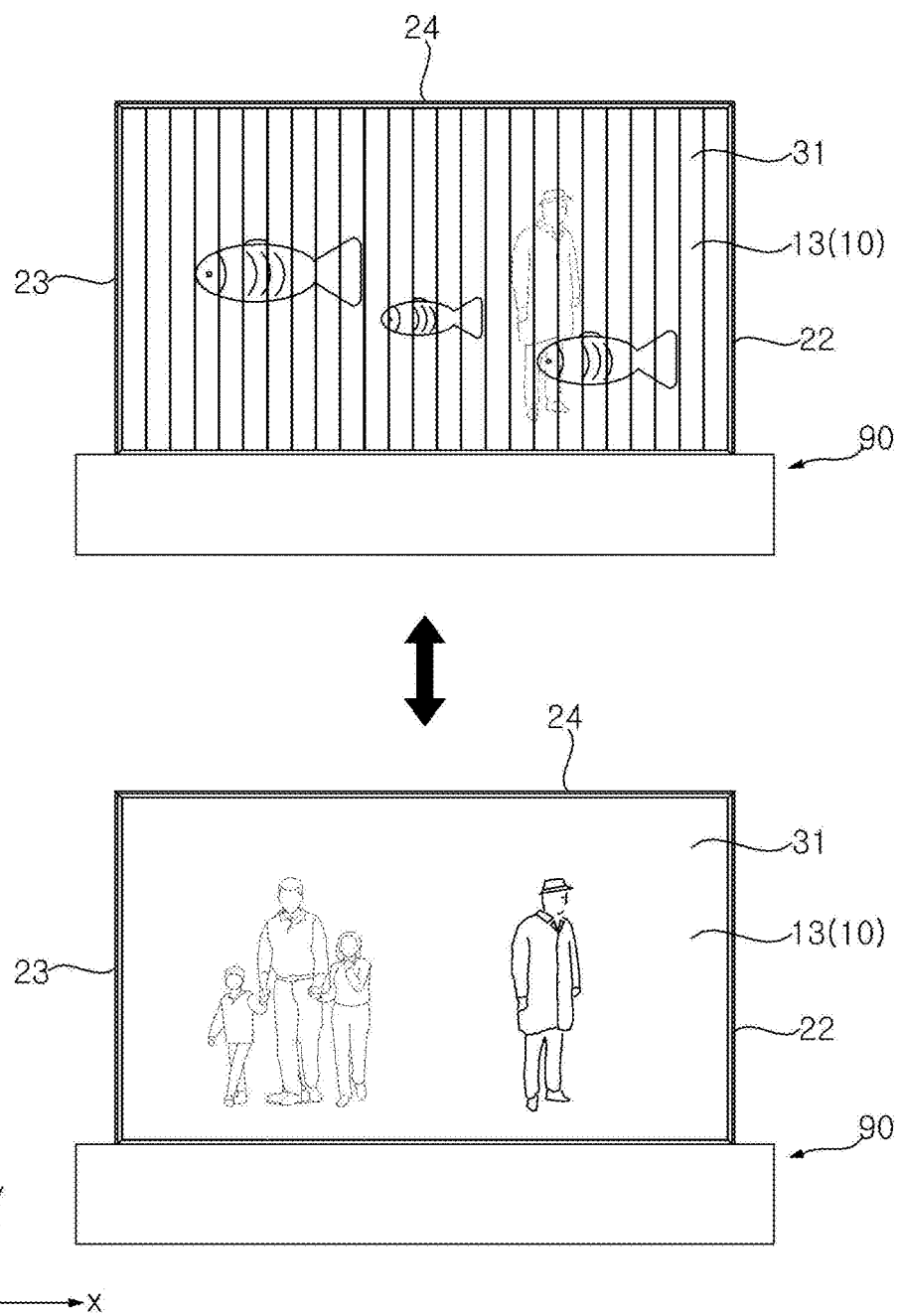

[FIG. 27]
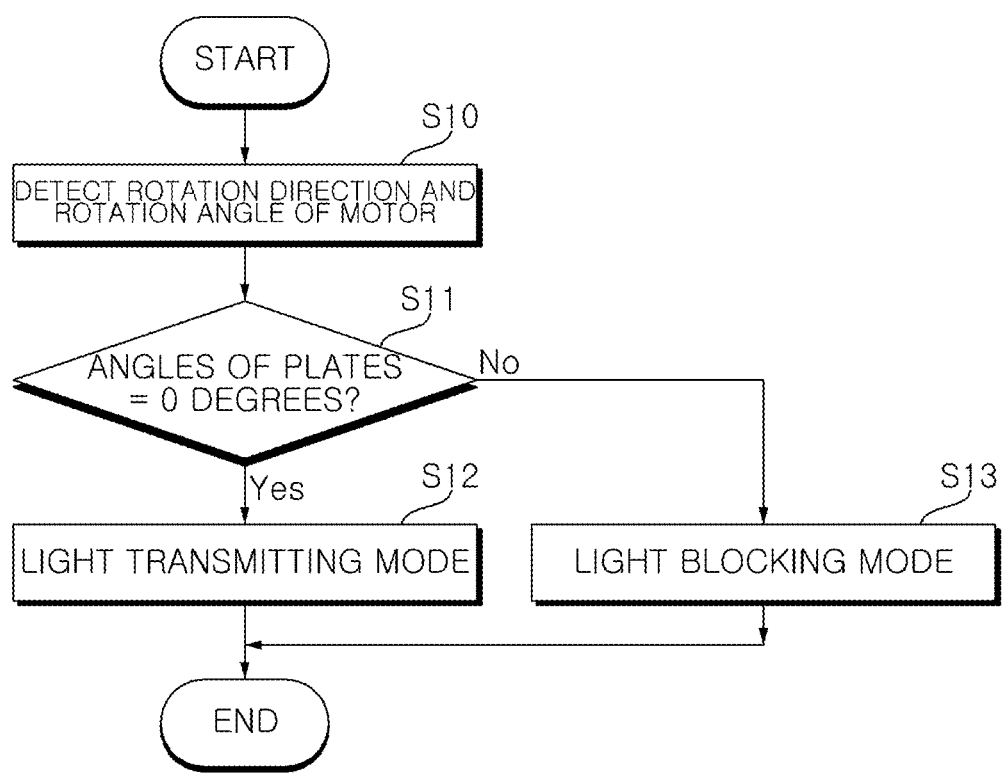

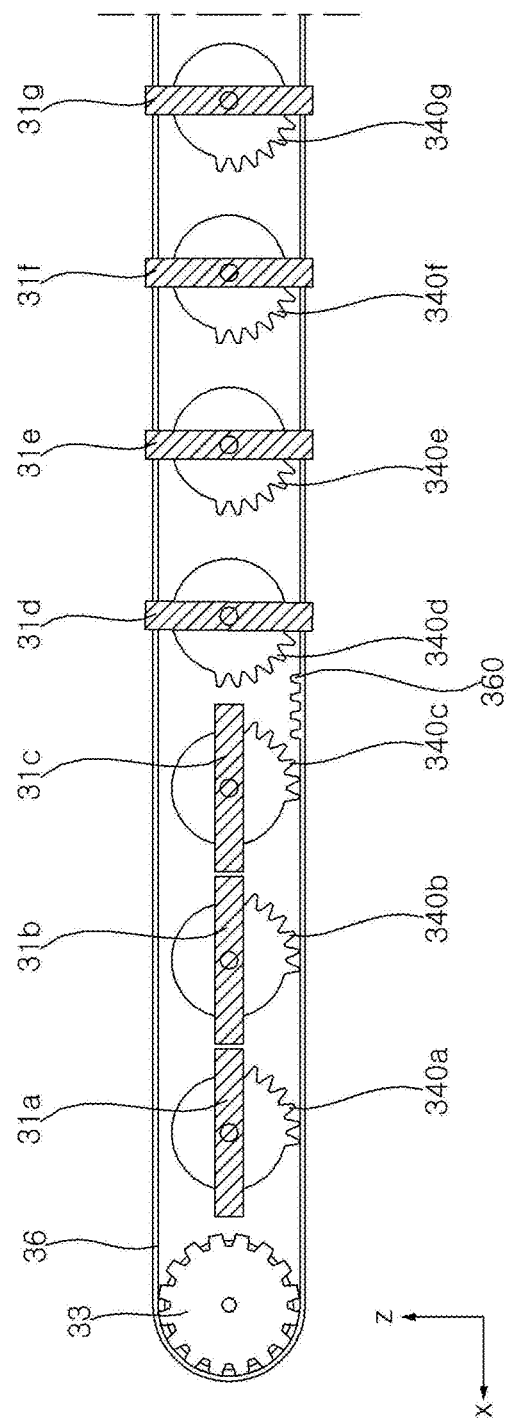
[FIG. 28]

[FIG. 29]
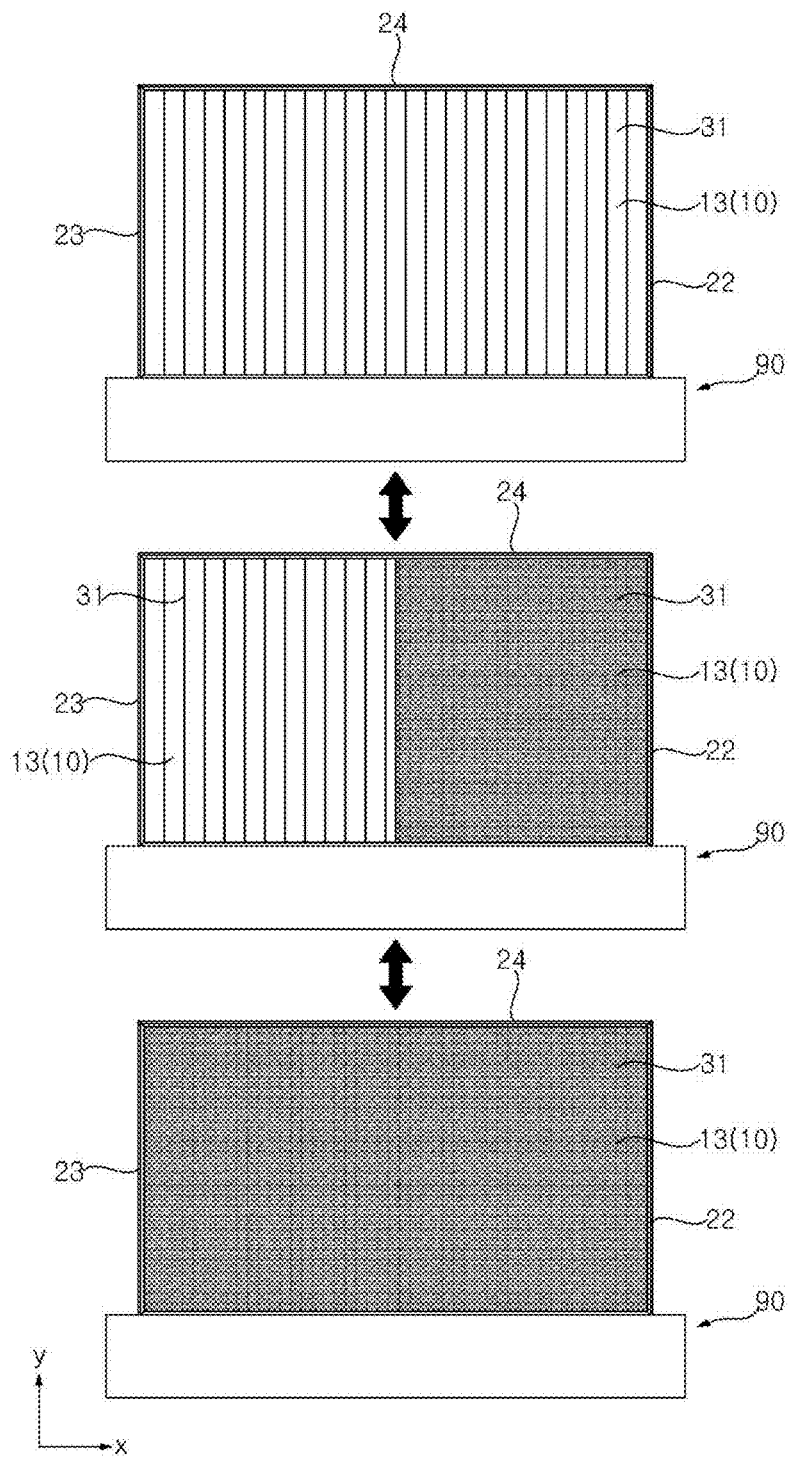

[FIG. 30]
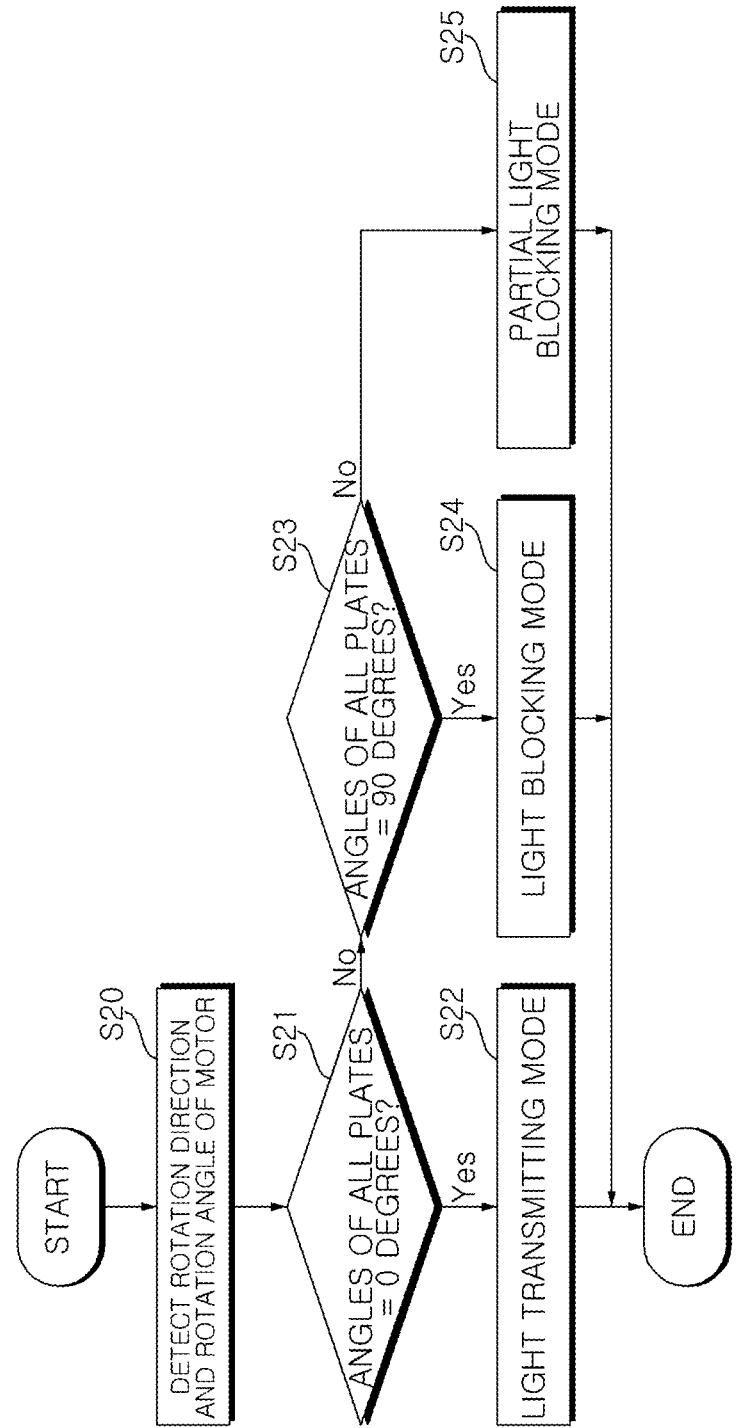

[FIG. 31]
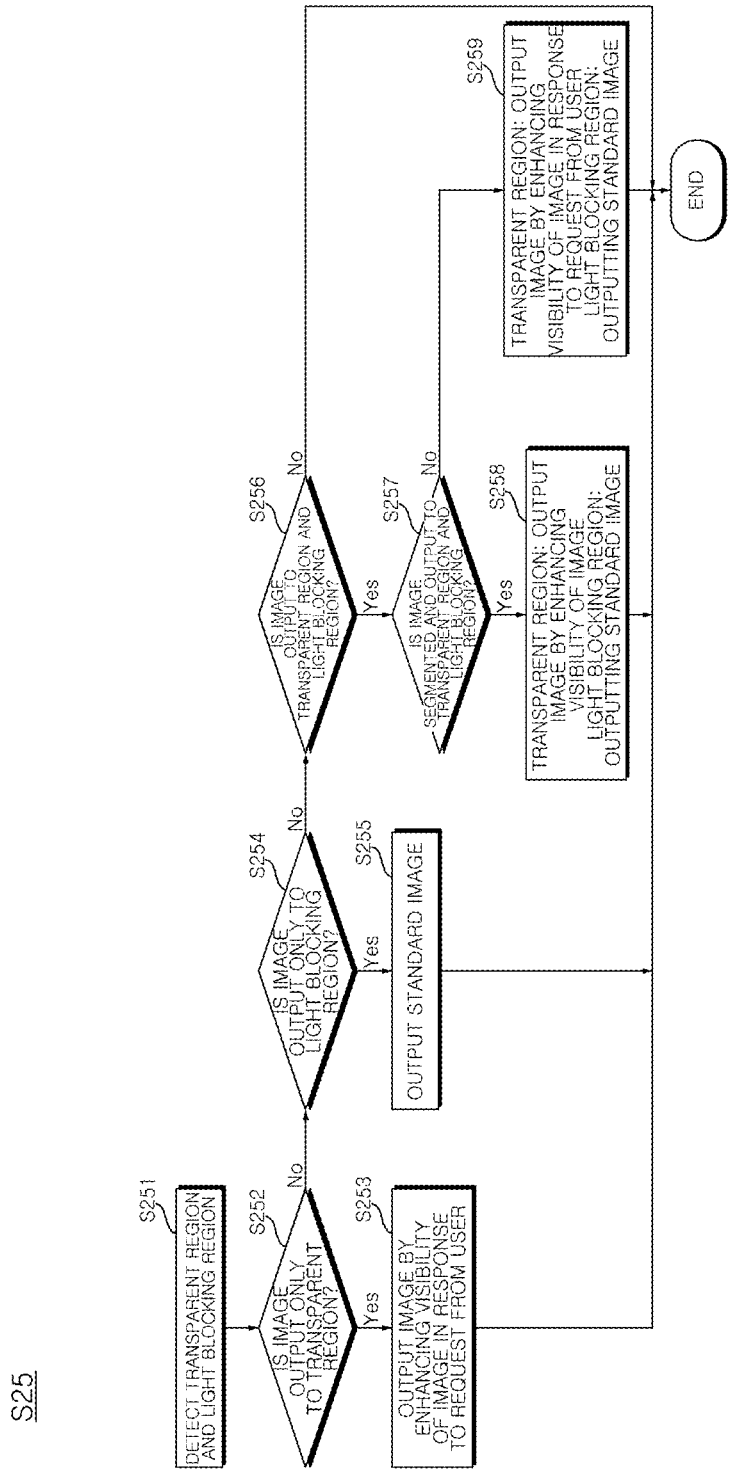

[FIG. 32]
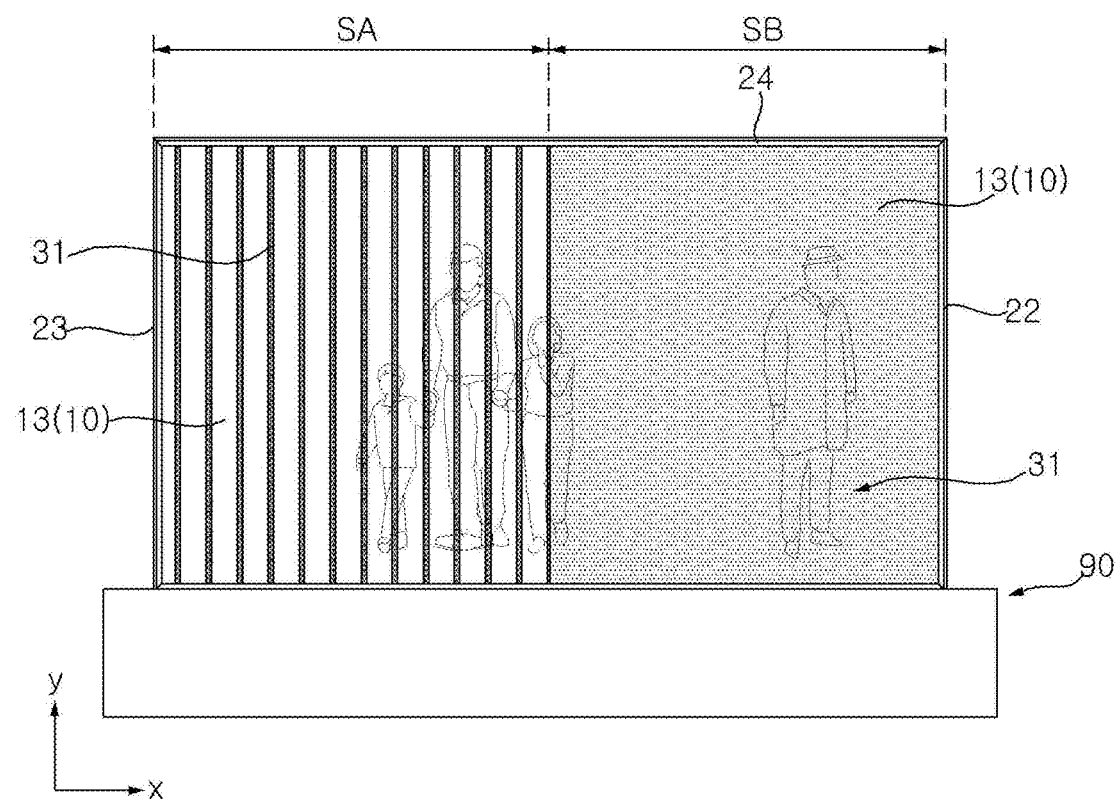

[FIG. 33]
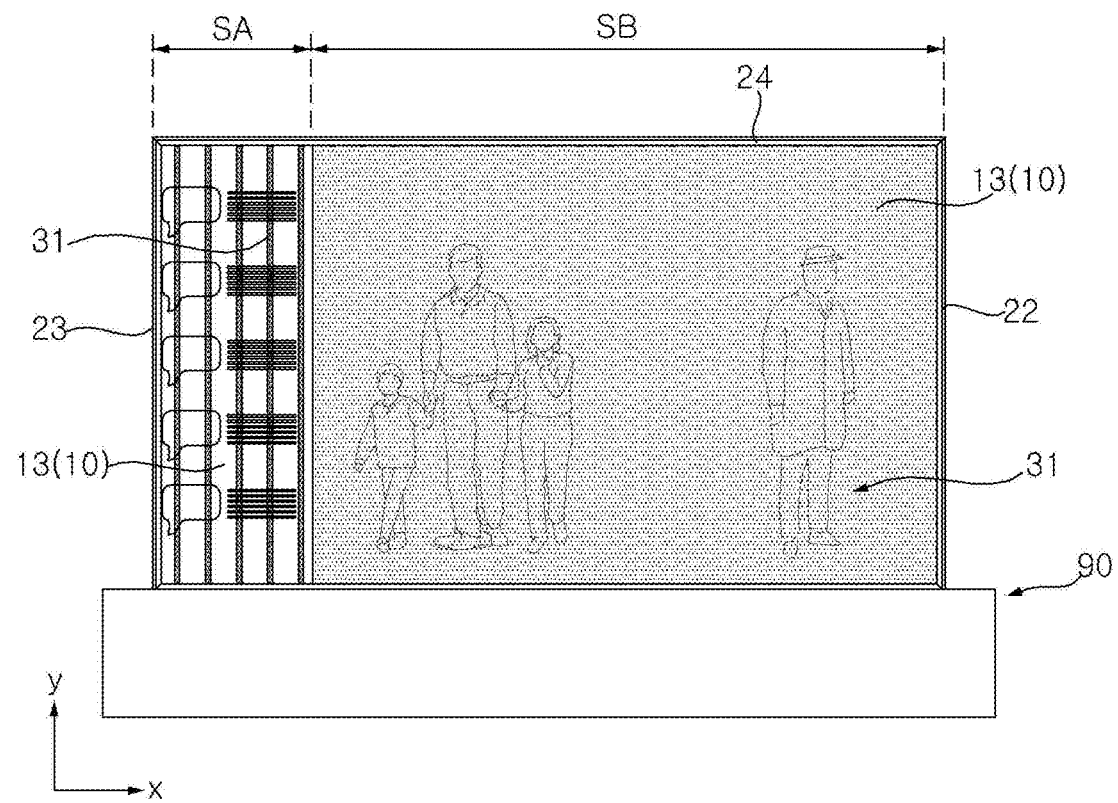

[FIG. 34]
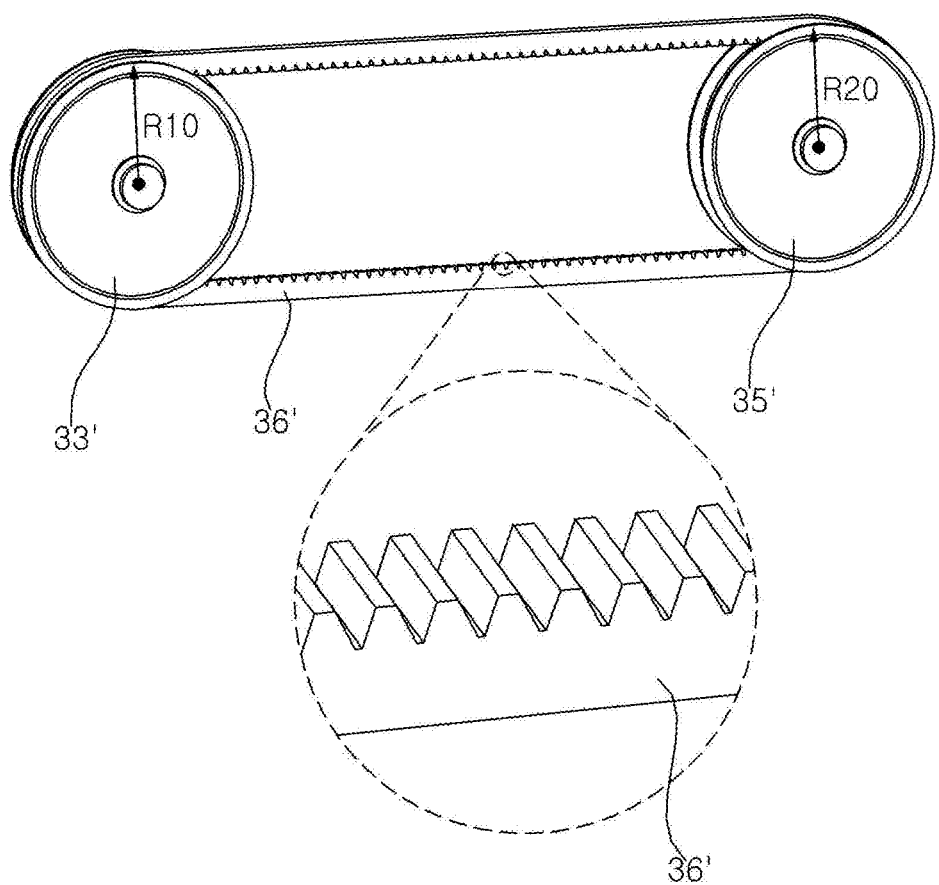

[FIG. 35]
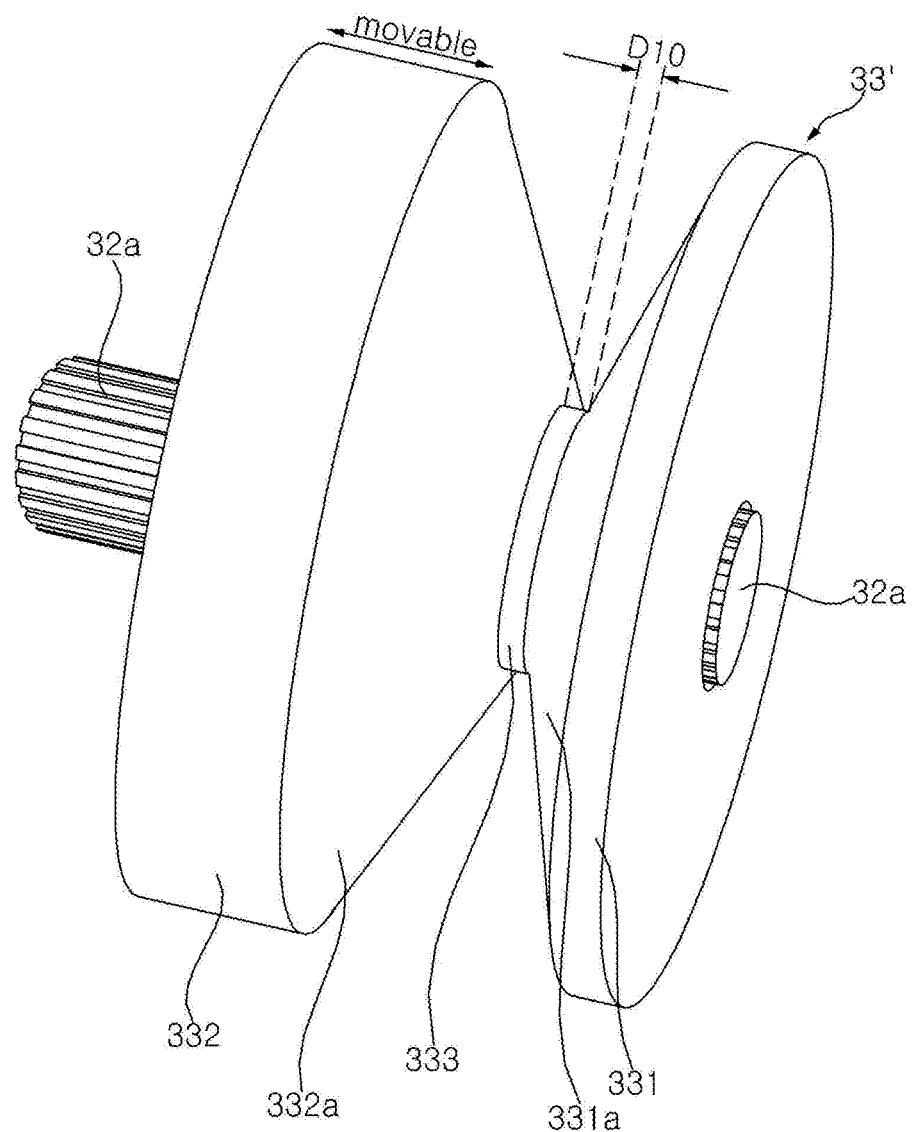

[FIG. 36]
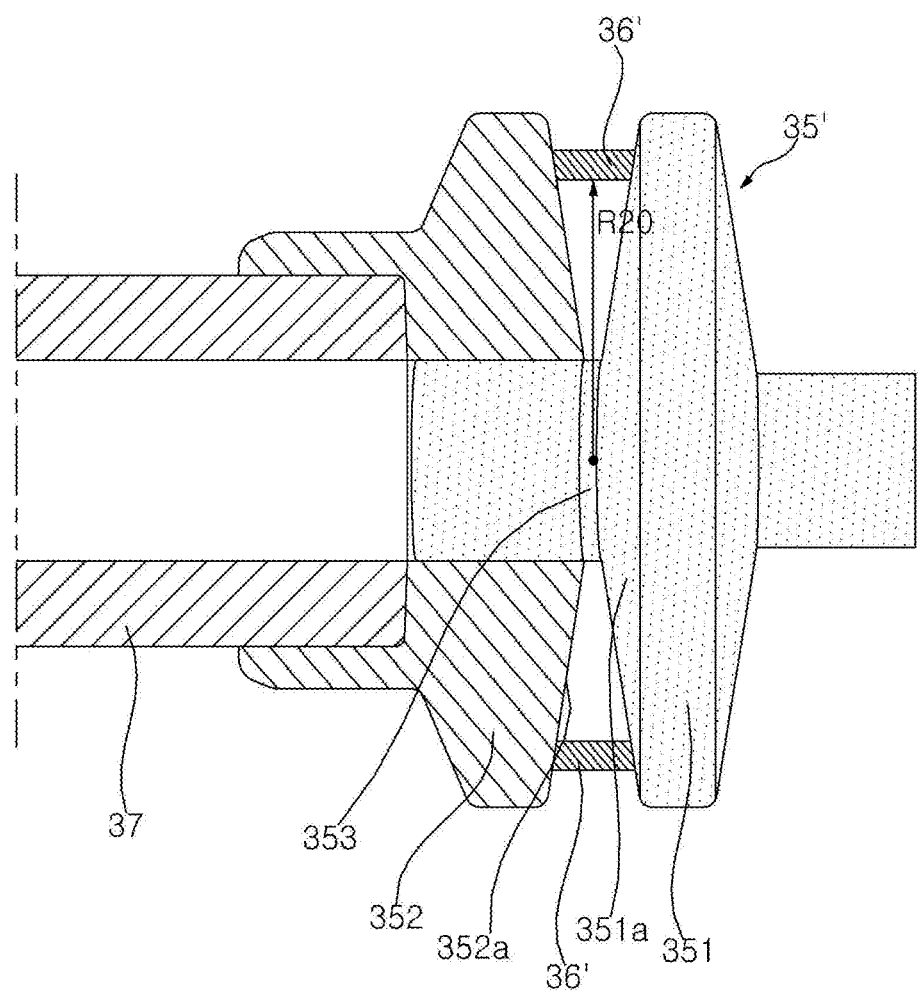

[FIG. 37]
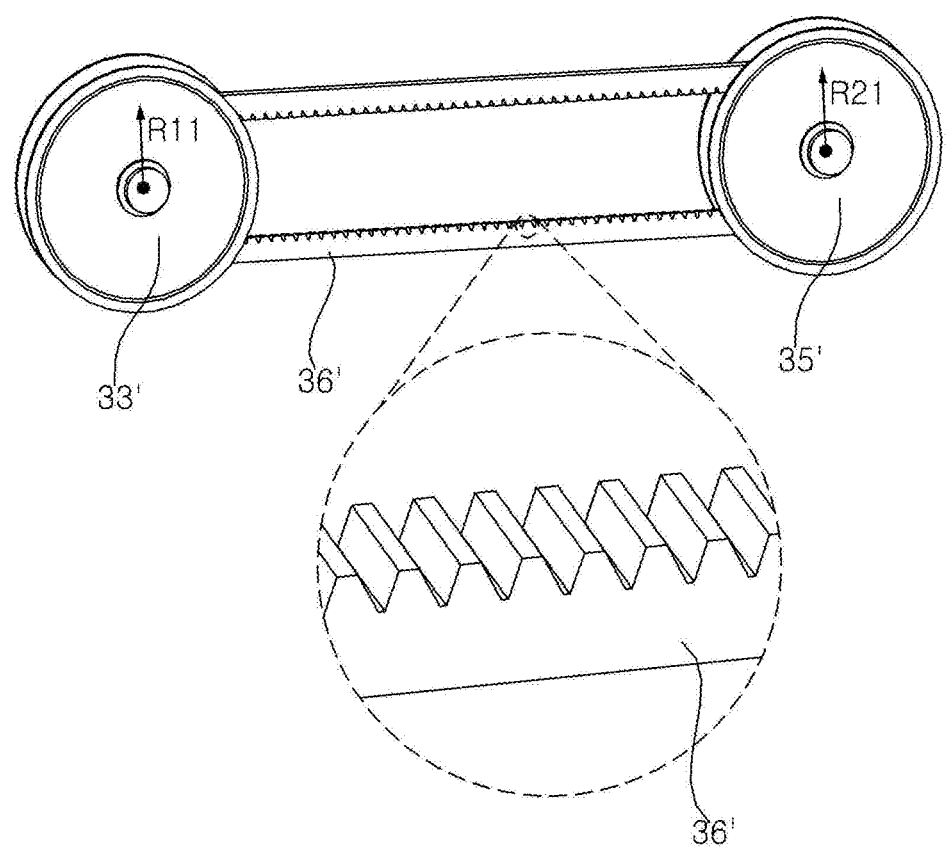

[FIG. 38]
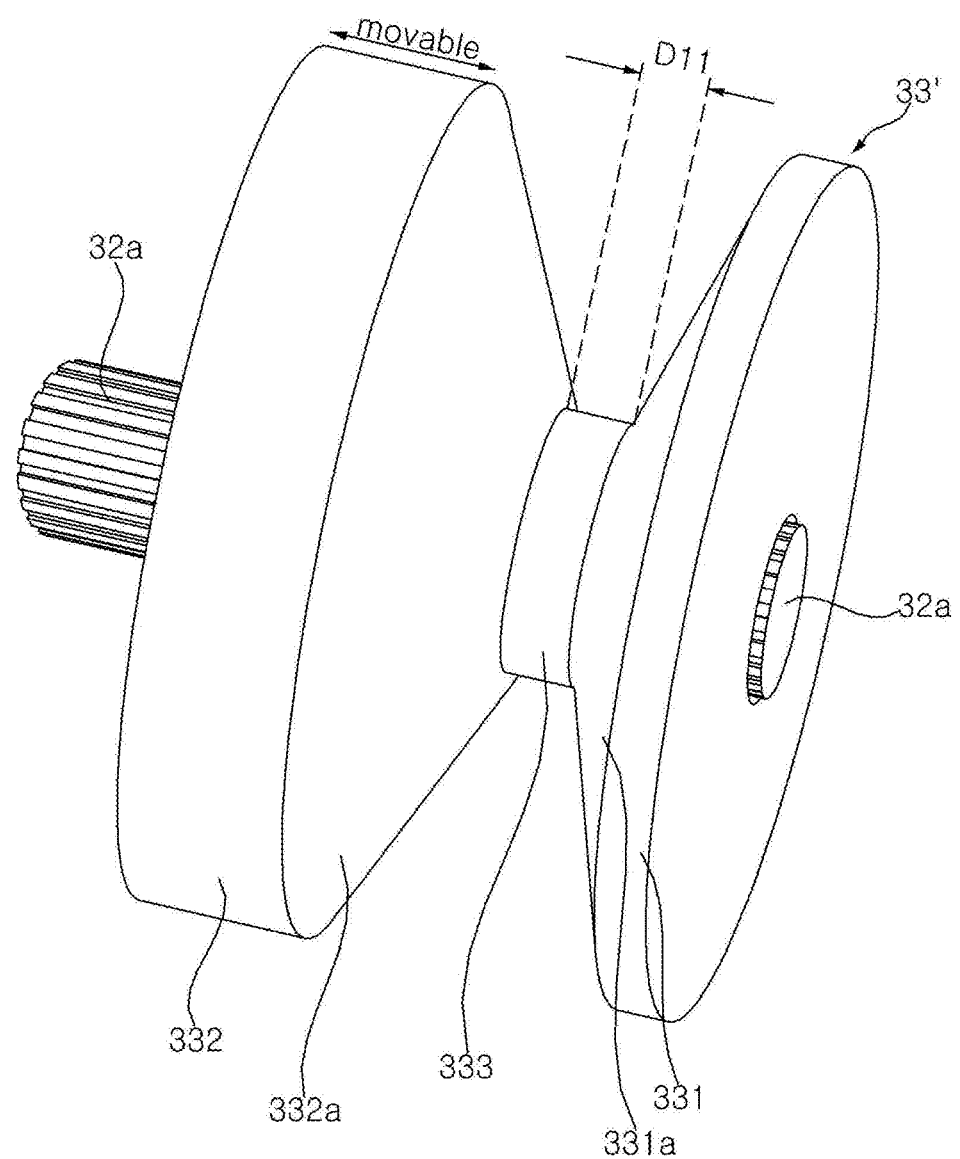

[FIG. 39]
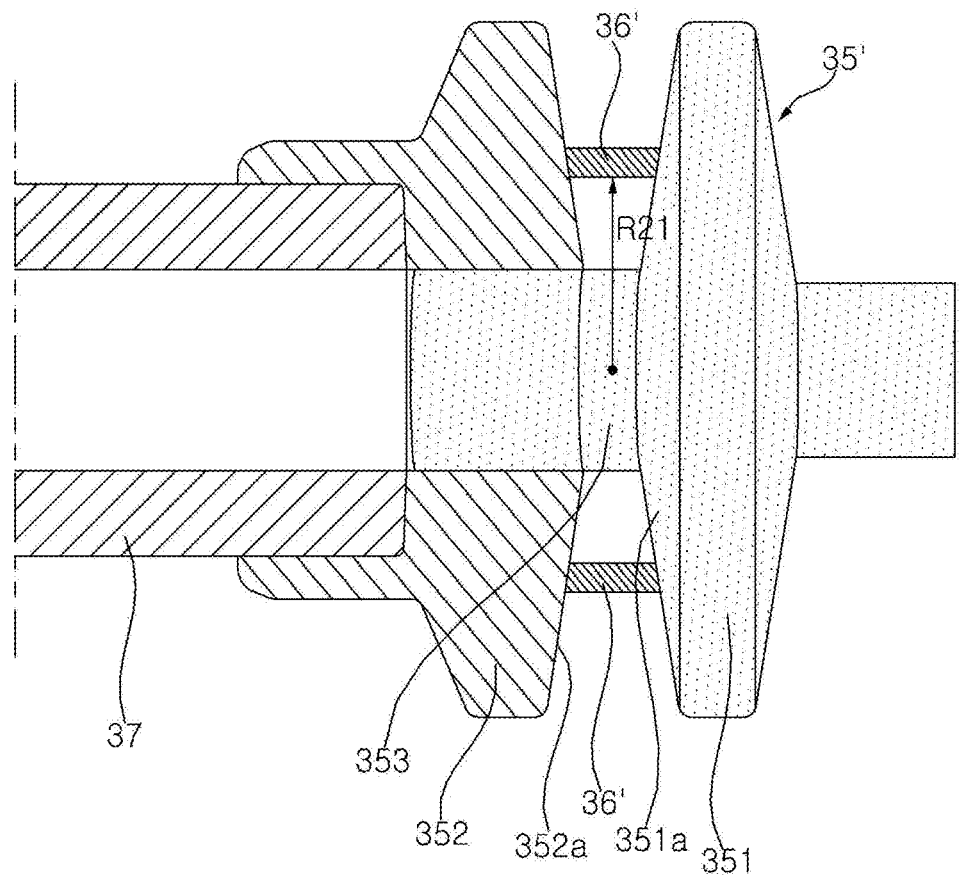

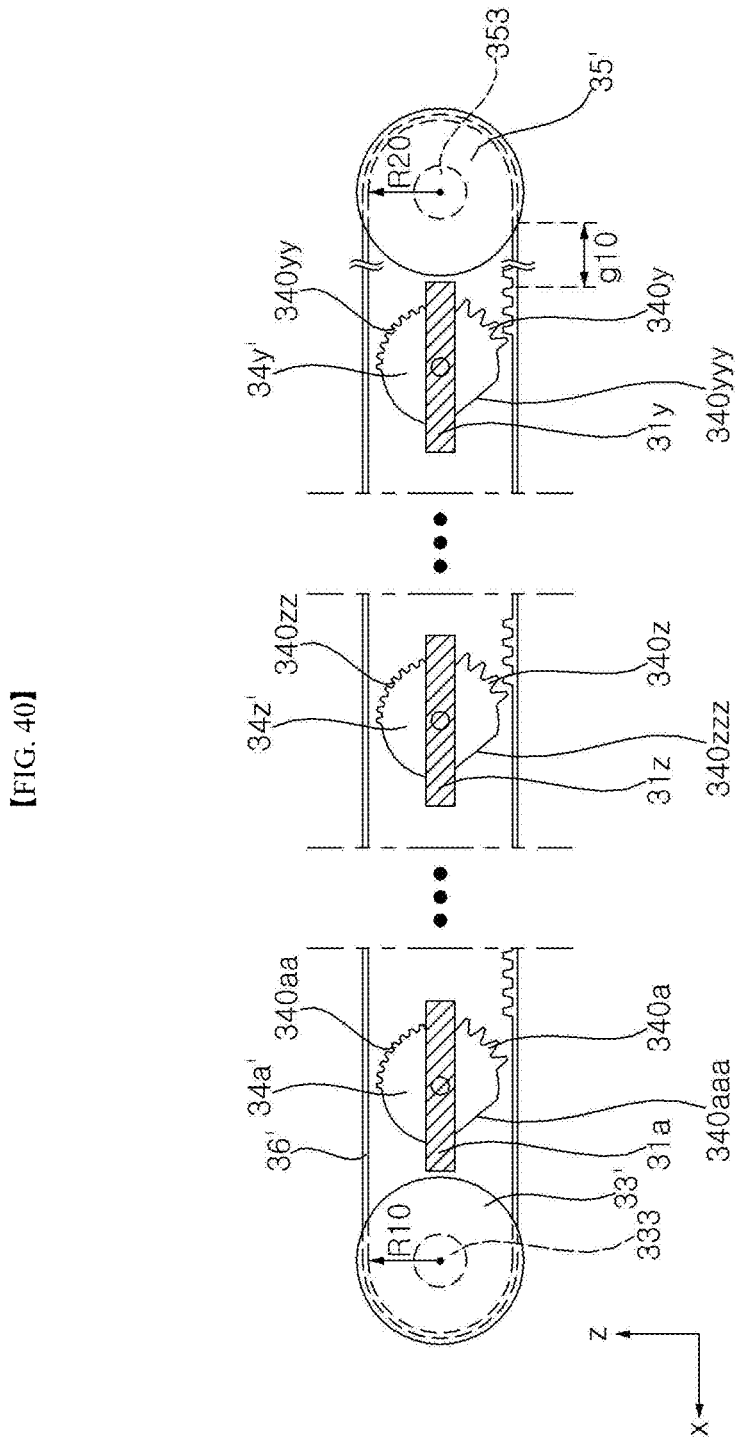
[FIG. 40]

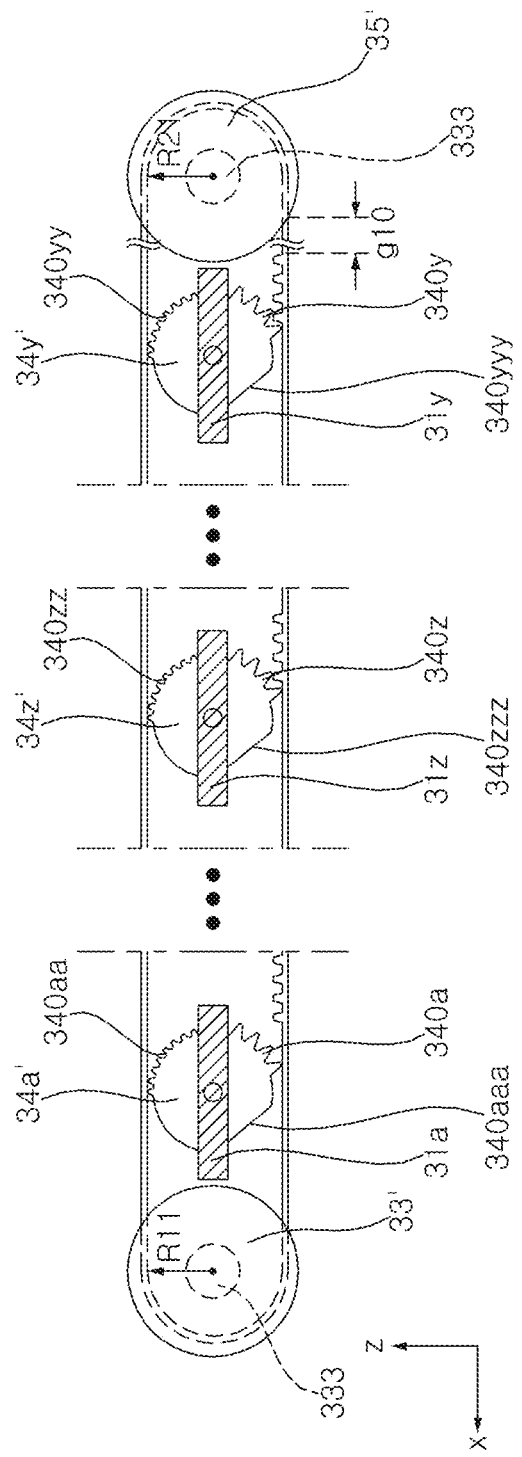
[FIG. 41]

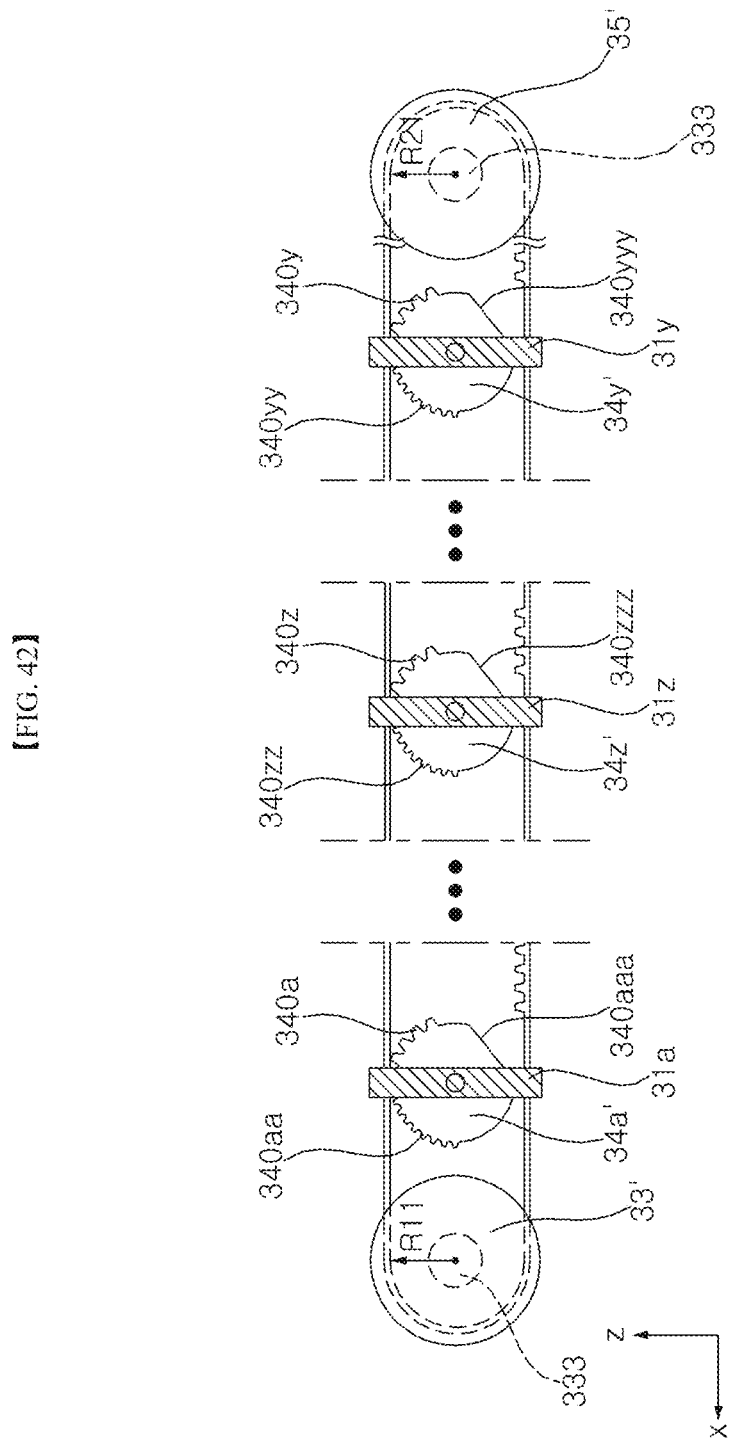
[FIG. 42]

[FIG. 43]
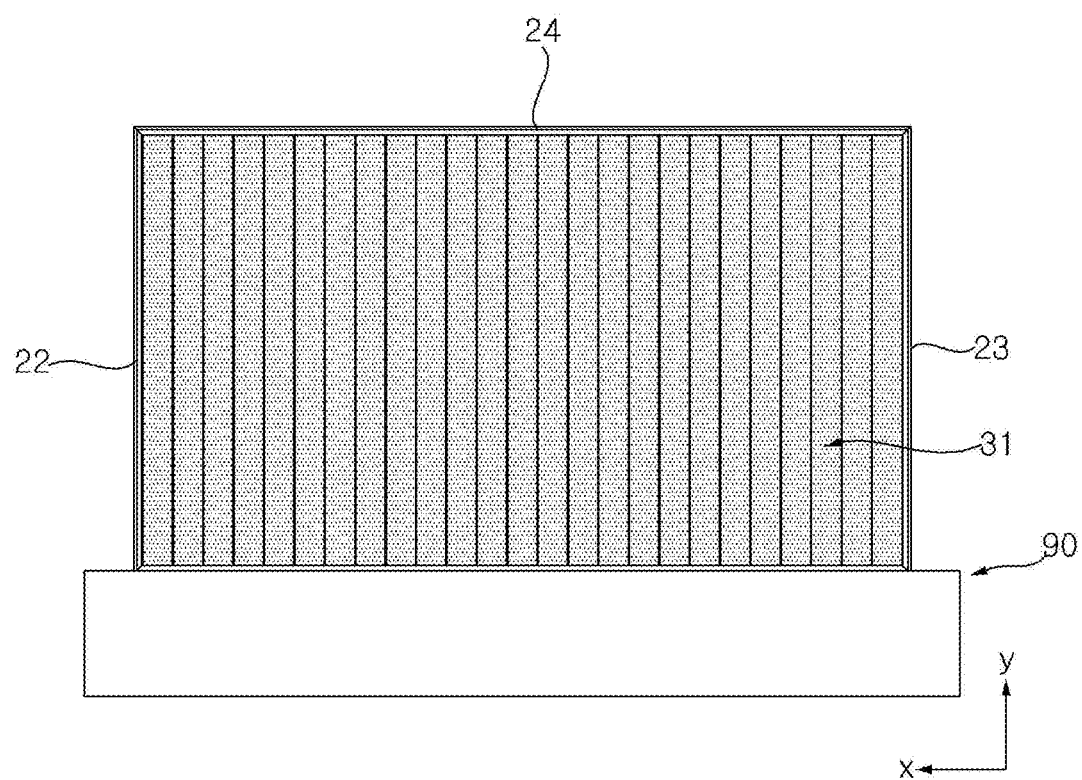

[FIG. 44]
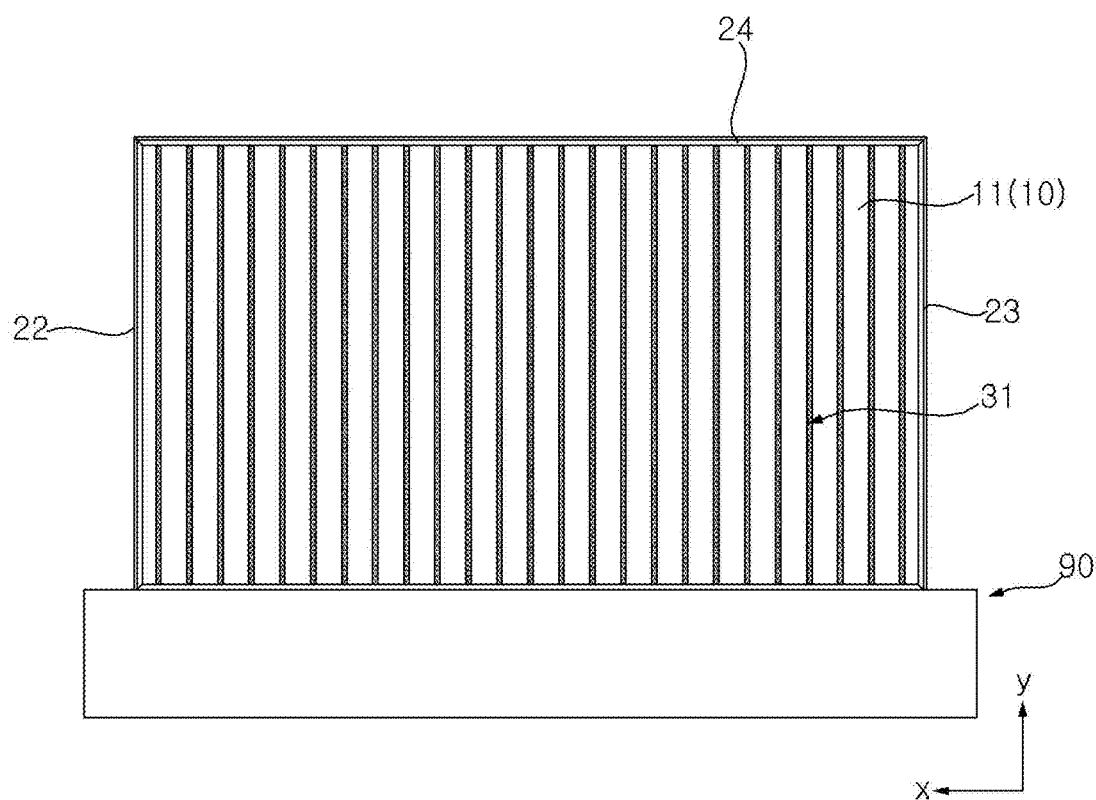

DISPLAY DEVICE

CROSS REFERENCE TO RELATED APPLICATION

This application is the National Phase of PCT International Application No. PCT/KR2022/004091, filed on Mar. 23, 2022, which is hereby expressly incorporated by reference into the present application.

BACKGROUND

Field of the Invention

The present disclosure relates to a display device. More particularly, the present disclosure relates to a display device including a transparent display panel.

Discussion of the Related Art

With the development of the information society, there have been growing demands for various types of display devices, and in order to meet these demands, various display devices, such as a liquid crystal display (LCD) device, a Plasma Display Panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light provided by a backlight unit. Further, the OLED panel may display images by using a self-emitting organic layer deposited on a substrate on which transparent electrodes are formed.

Recently, many studies are being conducted on a transparent display panel capable of not only displaying images for a user, but also allowing the user to see the rear side of the display panel.

SUMMARY OF THE DISCLOSURE

It is an objective of the present disclosure to solve the above and other problems.

Another objective may be to provide a display device including a transparent display panel.

Another objective may be to provide a structure for opening or closing a rear of a transparent display panel.

Another objective may be to provide a method of controlling an image output in a light transmitting mode or a light blocking mode of a transparent display panel.

In accordance with an aspect of the present disclosure for achieving the above and other objectives, a display device may include: a display panel having a light emitting region and a transparent region; a plurality of plates positioned behind the display panel, extending in a first direction, and sequentially arranged in a second direction; and a side frame extending along a periphery of the display panel and to which each of the plurality of plates is coupled so as to be rotatable about a rotation axis that is parallel to the first direction, wherein the plurality of plates sequentially rotate in the second direction and open or close a rear of the display panel, wherein the plurality of plates may include: a first plate; and a second plate spaced apart from the first plate in the second direction, wherein a start point of rotation of the second plate may be before an end point of rotation of the first plate.

ADVANTAGEOUS EFFECTS OF THE INVENTION

The display device according to the present disclosure has the following effects.

According to at least one of the embodiments of the present disclosure, a display device having a transparent display panel may be provided.

According to at least one of the embodiments of the present disclosure, a structure for opening and closing the rear side of a transparent display panel may be provided.

According to at least one of the embodiments of the present disclosure, there may be provided a method of controlling an image output in a light transmitting mode or a light blocking mode of a transparent display panel.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF THE DRAWINGS

FIGS. 1 to 44 are diagrams illustrating examples of a display device according to embodiments of the present disclosure.

DETAILED DESCRIPTION OF THE EMBODIMENTS

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A singular representation may include a plural representation unless context clearly indicates otherwise.

It should be understood that the terms "comprise," "include," "have," etc. when used in this specification, specify the presence of stated features, integers, steps, operations, elements, components, or combinations thereof but do not preclude the presence or addition of one or more other features, integers, steps, operations, elements, components, or combinations thereof.

References to directions, such as up (U), down (D), left (Le), right (Ri), front (F), and rear (R), shown in the drawings are provided merely for convenience of explanation and are not intended for limiting the scope of the present disclosure.

Referring to FIG. 1, a display device 1 may include a display 10, a side frame 20, and a housing 90. The display 10 may display an image. The side frame 20 may extend around the periphery of the display 10. The housing 90 may be disposed under the display 10 and the side frame 20.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

The long sides LS1 and LS2 and the short sides SS1 and SS2 of the display device 1 may be formed on the side frame 20.

A direction parallel to the long sides LS1 and LS2 of the display device 1 may be referred to as a left-right direction. A direction parallel to the short sides SS1 and SS2 of the display device 1 may be referred to as an up-down direction. A direction perpendicular to the long sides LS1 and LS2 and the short sides SS1 and SS2 of the display device 1 may be referred to as a front-rear direction.

A side on which the display device 1 displays an image may be referred to as a front side F, z, and a side opposite thereto may be referred to as a rear side R. The first short side SS1 may be referred to as a left side Le, x, and the second short side SS2 may be referred to as a right side Ri. The first long side LS1 may be referred to as an upper side U, y, and the second long side LS2 may be referred to as a lower side D.

The following description will be given using an Organic Light Emitting Diode (OLED) panel as an example of a display panel, but a display panel which is applicable to the present disclosure is not limited thereto.

Referring to FIG. 2, a controller 110 of the display device 1 may control the operation of the display device 1. The controller 110 may be electrically connected to components of the display device.

The display panel 11, a main board 11m, a power supply board 11p, and a Timing Controller (T-Con) board 11c may be installed in an inner space of the housing 90 and may be electrically connected to the controller 110. The main board 11m may control the display device 1. The controller 110 may be implemented as the main board 11m or may be a superordinate control unit that controls the main board 11m and the like. The power supply board 11p may supply power to each component of the display device 1. The T-CON board 11c may provide a video signal to the display panel 11.

A motor 23 and a sensor 39b of a blind assembly 30 may be electrically connected to the controller 110. The controller 110 may control the operation of the motor 32, i.e., rotation amount (rotation angle), rotation direction and rotation speed thereof. The motor 32 may be a step motor. The controller 110 may detect the operation of the motor 32 based on information acquired from the sensor 39b.

A speaker SPK may be installed in the inner space of the housing 90 and may be electrically connected to the controller 110. A speaker hole (not shown) may be formed in the housing 90, and the speaker SPK may provide sound through the speaker hole.

A communication unit Cm may transmit information of the display device to an external device, or may transmit various types of information or signals from the external device to the display device 1. The communication unit Cm may communicate with a remote control device, a mobile terminal, a wired/wireless router, or other communication infrastructure (e.g., a server), etc. For example, the communication unit Cm may perform wireless communication with an external device by using communication technology such as IEEE 802.11 WLAN, IEEE 802.15 WPAN, UWB, Wi-Fi, Zigbee, Z-wave, and Blue-Tooth, and the like.

A memory 11r may be electrically connected to the controller 110. The memory 11r may store basic data about the display device 1 (e.g., basic specification information of each component of the display device, such as display resolution, brightness, sound output value, the number and position of plates of the blind assembly, etc.), data and programs for controlling the operation of the display device 1, data input from an external source, or data processed by the controller 110, etc. For example, the memory 11r may store information about the operation of the motor 32. For example, the memory 11r may include ROM, RAM, EPROM, a flash drive, or a hard drive, etc. For example, the memory 11r may be classified as a sub-configuration of the controller 110.

Referring to FIG. 3, the display 10 may include a display panel 11, a first interface 11a, a second interface 11b, a timing controller 11c, a gate driver 11d, a data driver 11e, a memory 11f, a processor 11g, a power supply 11h, and a current detector 11i. The display panel 11 may be an Organic Light Emitting Diode (OLED) panel.

The first interface 11a may receive first direct current (DC) power V1 from an external power supply unit of the display 10, and the first DC power V1 may be supplied for the operation of the power supply 11h and the timing controller 11c.

The second interface 11b may receive second DC power V2 from an external power supply unit of the display 10, and the second DC power V2 may be supplied to the data driver 11e.

The timing controller 11c may output a data driving signal Sda and a gate driving signal Sga based on a video signal Vd input to the first interface 11a. For example, the first interface 11a may convert the input video signal Vd and may output the converted +video signal Va1 acquired by converting the video signal Vd, and the timing controller 11c may output the data driving signal Sda and the gate driving signal Sga based on the converted video signal Vd. The data driving signal Sda may be a signal for driving subpixels of the display panel 11. In addition, the timing controller 11c may further output a control signal Cs to the gate driver 11d.

The gate driver 11d and the data driver 11e may supply a scan signal and a video signal to the display panel 11 through gate lines GL and data lines DL according to the gate driving signal Sga and the data driving signal Sda of the timing controller 11c, thereby allowing the display panel 11 to display a video.

The power supply 11h may supply various powers to the gate driver 11d, the data driver 11e, the timing controller 11c, and the like.

The current detector 11i may detect a current flowing to sub-pixels of the display panel 11. The detected current may be input to the processor 11g for calculating an accumulated current amount. The calculated accumulated current may be stored in the memory 11f.

The processor 11g may perform various control operations in the display 10. For example, the processor 11g may control the gate driver 11d, the data driver 11e, the timing controller 11c, and the like.

Referring to FIGS. 4 and 5, the display panel 11 may include a plurality of scan lines Scan 1 to Scan n and a plurality of data lines R1, G1, B1, W1 to Rm, Gm, Bm, and Wm. The plurality of data lines R1, G1, B1, W1 to Rm, Gm, Bm, and Wm may intersect the plurality of scan lines Scan 1 to Scan n. Subpixels may be formed in regions where the plurality of scan lines intersect the plurality of data lines. A pixel may be a hold-type element that continues to emit light from an organic light-emitting layer (OLED) during a unit frame period after a scan signal is applied. For example, the pixel may include RGBW subpixels. In another example, the pixel may include RGB subpixels.

A subpixel circuit CRTm is of an active type, and may include a scan switching element SW1, a storage capacitor Cst, a driving switching element SW2, and an organic light emitting layer OLED.

The scan switching element SW1 is turned on in response to a scan signal Vscan input from the scan line. When the scan switching element SW1 is turned on, the scan switching element SW1 may transmit a data signal Vdata, input from the data line, to one end of the storage capacitor Cst or a gate terminal of the driving switching element SW2.

The storage capacitor Cst may be provided between the gate terminal and the source terminal of the drive switching element SW2, and may store a difference between a level of a data signal, which is transmitted to one end of the storage capacitor Cst, and a level of direct current power (VDD) which is transmitted to the other end of the storage capacitor Cst.

For example, in the case where data signals have different levels by a pulse amplitude modulation (PAM) method, a power level stored in the storage capacitor Cst varies according to a level difference of the data signals (Vdata). In another example, in the case where data signals have different pulse widths by a pulse width modulation (PWM) method, a power level stored in the storage capacitor Cst varies according to a pulse width difference of the data signals (Vdata).

The driving switching element SW2 may be turned on according to the power level stored in the storage capacitor Cst. When the driving switching element SW2 is turned on, a driving current IOLED, which is proportional to the stored power level, flows to the OLED layer, thereby allowing the OLED layer to perform a light-emitting operation.

The OLED layer includes an RGBW light-emitting layer (EML) corresponding to sub-pixels, and may include at least one of a hole injection layer (HIL), a hole transport layer (HTL), an electron transport layer (ETL), and an electron injection layer (EIL), and may further include a hole blocking layer and the like in addition to these layers.

While FIG. 5 illustrates a p-type MOSFET as the scan switching element SW1 and the driving switching element SW2, but an n-type MOSFET and other switching devices, such as JFET, IGBT, or SIC, may also be used.

Referring to FIG. 6, a pixel may include a light emitting region and a transparent region. The light emitting region includes RGBW subpixels arranged in a longitudinal direction, and the transparent region with no subpixels may be disposed next to the light emitting region.

Accordingly, the display panel 11 including the plurality of pixels may not only display an image, but also allow light to be transmitted therethrough. The display panel 11 may be referred to as a transparent display panel or a transparent OLED panel.

Referring to FIG. 7, a pixel may include a light emitting region and a transparent region. The light emitting region may include RGW or BGW subpixels that are adjacent to each other, and the transparent region with no subpixels may be disposed next to the light emitting region.

Accordingly, the display panel 11 including the plurality of pixels may not only display an image, but also allow light to be transmitted therethrough. The display panel 11 may be referred to as a transparent display panel or a transparent OLED panel.

Referring to FIGS. 8 and 9, the display panel 11 may divide an image into a plurality of pixels and may output the image while controlling color, brightness, and chroma of the respective pixels. The display panel 11 may be divided into an active area, in which the image is displayed, and a de-active area in which the image is not displayed. The display panel 11 may generate light corresponding to red (R), green (G), or blue (B) color in response to a control signal.

A source PCB 14 may be adjacent to a lower side of the display panel 11 and may extend along the lower side. The source PCB 14 may be electrically connected to the display panel 11 by a Source Chip On Film (COF) 15. The source PCB 14 may be electrically connected to the timing controller board 11c (see FIGS. 1 and 2) through a cable (not shown) such as a flexible flat cable (FFC).

A transparent panel 13 may be disposed at the front of the display panel 11. The transparent panel 13 may be transparent glass. An adhesive film 12 may be provided between the display panel 11 and the transparent panel 13, and may be bonded to the display panel 11 and the transparent panel 13. The adhesive film 12 may be an Optically Clear Adhesive film.

For example, a size of the adhesive film 12 may correspond to a size of the display panel 11 and may be smaller than a size of the transparent panel 13.

Meanwhile, the display panel 11, the adhesive film 12, and the transparent panel 13 may be referred to as the display 10.

Referring to FIGS. 9 and 10, a bottom part 21 of the side frame 20 may be adjacent to the lower side of the display 10 and may extend along the lower side. A slit 21P may be formed through the bottom part 21 in a vertical direction, and may extend in a longitudinal direction of the bottom part 21. The transparent panel 13 may pass through the slit 21P, and the display panel 11 may be disposed on the bottom part 21.

A left part 22 of the side frame 20 may be adjacent to the left side of the display 10 and may extend along the left side. A lower end of the left part 22 may be coupled to a left end of the bottom part 21. A left groove 22g may be formed in an inner surface of the left part 22 and may extend in a longitudinal direction of the left part 22. The left groove 22g may be located closer to a front end than a rear end of the left part 22. The left side of the display 10 may be inserted into the left groove 22g.

A right part 23 of the side frame 20 may be adjacent to the right side of the display 10 and may extend along the right side. A lower end of the right part 23 may be coupled to a right end of the bottom part 21. A right groove 23g may be formed in an inner surface of the right part 23 and may extend in a longitudinal direction of the right part 23. The right groove 23g may be located closer to a front end than a rear end of the right part 23. The right side of the display 10 may be inserted into the right groove 23g.

A bottom hole 21h may be formed through the bottom part 21 in a vertical direction. The bottom hole 21h may be spaced rearward from the display panel 11. The bottom hole 21h may be adjacent to a rear end of the bottom part 21. A plurality of bottom holes 21h may be spaced apart from each other in a longitudinal direction of the bottom part 21.

Referring to FIGS. 11 and 12, a top part 24 of the side frame 20 may be adjacent to the upper side of the display 10 and may extend along the upper side. A left end of the top part 24 may be coupled to an upper end of the left part 22, and a right end of the top part 24 may be coupled to an upper end of the right part 23. A top groove 24g may be formed in an inner surface of the top part 24 and may extend in a longitudinal direction of the top part 24. The top groove 24g may be located closer to a front end than a rear end of the top part 24. The upper side of the display 10 may be inserted into the top groove 24g. Accordingly, the side frame 20 may have a square frame shape and may cover the periphery of the display panel 11.

A top hole 24h may be a recess formed in an inner surface of the top part 24 or may be formed through the top part 24 in a vertical direction. In the vertical direction, the top hole 24h may be aligned with the bottom hole 21h (see FIG. 10). A plurality of top holes 24h may be spaced apart from each other in a longitudinal direction of the top part 24.

A blind assembly 30 may include a plate 31, a motor 32, a drive pulley 33, a gear 34, a driven pulley 35, and a belt 36. Here, the motor 32, the drive pulley 33, the gear 34, the driven pulley 35, and the belt 36 may be collectively referred to as a driving module.

The plate 31 may be disposed at the rear of the display panel 11 and may be disposed inside the side frame 20. The plate 31 may be vertically elongated. The plate 31 may be referred to as a blind 31 or a blade 31.

A lower end of the plate 31 may be disposed on or adjacent to an upper surface of the bottom part 21. A bottom pin 31B of the plate 31 may protrude downward from the lower end of the plate 31, may pass through the bottom hole 21h (see FIG. 10) of the bottom part 21, and may be rotatably coupled to the bottom part 21.

An upper end of the plate 31 may be disposed on or adjacent to a lower surface of the top part 24. A top pin 31T of the plate 31 may protrude upward from the upper end of the plate 31, may pass through the top hole 24h of the top part 24, and may be rotatably coupled to the top part 24.

The bottom pin 311 and the top pin 312 may be aligned with each other in a longitudinal direction, i.e., in a vertical direction, of the plate 31. A rotation axis of the plate 31 may be coaxial with the central axis of the bottom pin 311 and the top pin 312.

The plurality of plates 31 may be disposed sequentially from the left part 22 toward the right part 23 and may be adjacent to each other. Each of the plurality of plates 31 may be rotatably coupled to the bottom part 21 and the top part 24. A rotation axis of any one of the plurality of plates 31 may be parallel to a rotation axis of another one.

The motor 32 may be disposed under the bottom part 21. The motor 32 may be adjacent to the left part 22 or the right part 23. The motor 23 may provide torque. The motor 32 may be an electric motor capable of adjusting a rotation direction, a rotation angle, and a rotation speed, and may have a rotating shaft 32a parallel to a vertical direction.

The drive pulley 33 may be orthogonal to the rotating shaft 32a of the motor 32 and may be fixed to the rotating shaft 32a. For example, the drive pulley 33 may be disposed under the left part 22, and the motor 32 may be opposite to the left part 22 with respect to the drive pulley 33. In this case, the driven pulley 35 may be disposed under the right part 23. The belt 36 may mesh with the drive pulley 33 and the driven pulley 35. The belt 36 may be a timing belt.

The gear 34 may be disposed between the drive pulley 33 and the driven pulley 35 and may be adjacent to an inner circumferential surface of the belt 36. The gear 34 may be opposite to the plate 31 with respect to the bottom part 21, and may be fixed to the bottom pin 311 of the plate 31. The bottom pin 311 of each of the plurality of plates 31 may be fixed to each of the plurality of gears 34, and may provide a rotating shaft for each of the plurality of gears 34. Accordingly, the gear 34 and the plate 31 may rotate together.

Referring to FIG. 13, the motor 32, the drive pulley 33, the gear 34, the driven pulley 35, and the belt 36 which are described above may be accommodated in an inner space 90S of a housing 90.

An opening 90P may be formed in a top part 90T of the housing 90, and a portion of the bottom part 21 may pass through the opening. A mount plate 91 may protrude horizontally from the inside of a rear part 90R of the housing 90 and may be disposed closer to the top part 90T than a bottom part 90B of the housing 90. The motor 32 may be mounted on a lower surface of the mount plate 91 and the drive pulley 33, the gear 34, the driven pulley 35, and the belt 36 may be disposed on the mount plate 91.

A disc indicator 39 may be adjacent to a distal end of the rotating shaft 32a of the motor 32 and may be fixed to the rotating shaft 32a. A plurality of holes 39a may be formed in the disc indicator 39 and may be spaced apart from each other in a circumferential direction of the disc indicator 39.

The sensor 39b may be adjacent to the disc indicator 39 and may be fixed to the mount plate 91. The sensor 39b may be a photo sensor and may have a horseshoe shape. A light emitter and a light receiver of the sensor 39b may be opposite to each other with respect to the disc indicator 39. That is, as a rotating shaft 132a rotates, the disc indicator 39 may rotate while passing between the light emitter and the light receiver, and light from the light emitter may pass through a hole 39a or may be blocked by the disc indicator 39. Accordingly, the sensor 39b may detect the rotation number and/or rotation amount of the motor 132.

Referring to FIGS. 14 to 16, a plurality of protrusions 36a, 36b, 36c, 36d, 36e, 36f, and 36g may be formed on an inner circumferential surface of the belt 36 and may be spaced apart from each other with a plurality of gears 34a, 34b, 34c, 34d, 34e, 34f, and 34g disposed therebetween. The plurality of protrusions 36a, 36b, 36c, 36d, 36e, 36f, and 36g may protrude further toward the inside of the belt 36 than a portion of the belt 36 that meshes with the drive pulley 33 (i.e., the inner circumferential surface of the belt 36).

A plurality of gear teeth 340a, 340b, 340c, 340d, 340e, 340f, and 340g may be formed on the plurality of gears 34a, 34b, 34c, 34d, 34e, 34f, and 34g, respectively, and may mesh with the plurality of protrusions 36a, 36b, 36c, 36d, 36e, 36f, and 36g, respectively.

A first gear 34a may be adjacent to the drive pulley 33. The first gear 34a may be fixed to the bottom pin 311 of the first plate 31a. First gear teeth 340a may be formed on an outer circumferential surface of the first gear 34a1. The first gear teeth 340a may be located within a certain angle range (e.g., 90 degrees) in a circumferential direction of the first gear 34a. The first protrusion 36a may be formed between the drive pulley 33 and the first gear 34a, and may move closer to the first gear 34a by movement of the belt 36. Further, when the first protrusion 36a meshes with the first gear 34a, the first gear 34a and the first plate 31a may rotate about the bottom pin 311 of the first plate 31a by movement of the belt 36.

The second gear 34b may be opposite to the drive pulley 33 with respect to the first gear 34a. The second gear 34b may be fixed to the bottom pin 311 of the second plate 31b. Second gear teeth 340b may be formed on an outer circumferential surface of the second gear 34b. The second gear teeth 340b may be located within a certain angle range (e.g., 90 degrees) in a circumferential direction of the second gear 34b. The second protrusion 36b may be disposed between the first gear 34a and the second gear 34b, and may move closer to the second gear 34b by movement of the belt 36. In addition, when the second protrusion 36b meshes with the second gear 34b, the second gear 34b and the second plate 31b may rotate about the bottom pin 311 of the second plate 31b by movement of the belt 36.

A third gear 34c may be opposite to the first gear 34a with respect to the second gear 34b. The third gear 34c may be fixed to the bottom pin 311 of the third plate 31c. Third gear teeth 340c may be formed on an outer circumferential surface of the third gear 34c. The third gear teeth 340c may be located within a certain angle range (e.g., 90 degrees) in a circumferential direction of the third gear 34c. The third protrusion 36c may be disposed between the second gear 34b and the third gear 34c, and may move closer to the third gear 34c by movement of the belt 36. In addition, when the third protrusion 36c meshes with the third gear 34c, the third gear 34c and the third plate 31c may rotate about the bottom pin 311 of the third plate 31c by movement of the belt 36.

A fourth gear 34d may be opposite to the second gear 34b with respect to the third gear 34c. The fourth gear 34d may be fixed to the bottom pin 311 of the fourth plate 31d. Fourth gear teeth 340d may be formed on an outer circumferential surface of the fourth gear 34d. The fourth gear teeth 340d may be located within a certain angle range (e.g., 90 degrees) in a circumferential direction of the fourth gear 34d. The fourth protrusion 36d may be disposed between the third gear 34c and the fourth gear 34d, and may move closer to the fourth gear 34d by movement of the belt 36. In addition, when the fourth protrusion 36d meshes with the fourth gear 34d, the fourth gear 34d and the fourth plate 31d may rotate about the bottom pin 311 of the fourth plate 31d by movement of the belt 36.

A fifth gear 34e may be opposite to the third gear 34c with respect to the fourth gear 34d. The fifth gear 34e may be fixed to the bottom pin 311 of the fifth plate 31e. Fifth gear teeth 340e may be formed on an outer circumferential surface of the fifth gear 34e. The fifth gear teeth 340e may be located within a certain angle range (e.g., 90 degrees) in a circumferential direction of the fifth gear 34e. The fifth protrusion 36e may be disposed between the fourth gear 34d and the fifth gear 34e, and may move closer to the fifth gear 34e by movement of the belt 36. In addition, when the fifth protrusion 36e meshes with the fifth gear 34e, the fifth gear 34e and the fifth plate 31e may rotate about the bottom pin 311 of the fifth plate 31e by movement of the belt 36.

A sixth gear 34f may be opposite to the fourth gear 34d with respect to the fifth gear 34e. The sixth gear 34f may be fixed to the bottom pin 311 of the sixth plate 31f. Sixth gear teeth 340f may be formed on an outer circumferential surface of the sixth gear 34f. The sixth gear teeth 340f may be located within a certain angle range (e.g., 90 degrees) in a circumferential direction of the sixth gear 34f. The sixth protrusion 36f may be disposed between the fifth gear 34e and the sixth gear 34f, and may move closer to the sixth gear 34f by movement of the belt 36. In addition, when the sixth protrusion 36f meshes with the sixth gear 34f, the sixth gear 34f and the sixth plate 31f may rotate about the bottom pin 311 of the sixth plate 31f by movement of the belt 36.

A seventh gear 34g may be opposite to the fifth gear 34e with respect to the sixth gear 34f. The seventh gear 34g may be fixed to the bottom pin 311 of the seventh plate 31g. Seventh gear teeth 340g may be formed on an outer circumferential surface of the seventh gear 34g. The seventh gear teeth 340g may be located within a certain angle range (e.g., 90 degrees) in a circumferential direction of the seventh gear 34g. The seventh protrusion 36g may be disposed between the sixth gear 34f and the seventh gear 34g, and may move closer to the seventh gear 34g by movement of the belt 36. In addition, when the seventh protrusion 36g meshes with the seventh gear 34g, the seventh gear 34g and the seventh plate 31g may rotate about the bottom pin 311 of the seventh plate 31g by movement of the belt 36.

Referring to FIG. 14, the plurality of plates 31a, 31b, 31c, 31d, 31e, 31f, and 31g may be parallel to each other. A thickness direction of the plurality of plates 31a, 31b, 31c, 31d, 31e, 31f, and 31g may be parallel to a left-right direction. A space may be formed between the plurality of plates 31a, 31b, 31c, 31d, 31e, 31f, and 31g. Angles of the plurality of plates 31a, 31b, 31c, 31d, 31e, 31f, and 31g may be zero degrees.

In this case, the plurality of protrusions 36a, 36b, 36c, 36d, 36e, 36f, and 36g may be spaced apart from the plurality of gears 34a, 34b, 34c, 34d, 34e, 34f, 34g. A distance between each of the plurality of protrusions 36a, 36b, 36c, 36d, 36e, 36f, and 36g and each of the plurality of gears 34a, 34b, 34c, 34d, 34e, 34f, and 34g may increase away from the drive pulley 33.

Specifically, a length of each of the plurality of protrusions 36a, 36b, 36c, 36d, 36e, 36f, and 36g may be substantially equal to a length of each of the plurality of gear teeth 340a, 340b, 340c, 340d, 340e, 340f, and 340g. For example, each of the plurality of protrusions 36a, 36b, 36c, 36d, 36e, 36f, and 36g may have a length of πR/2, where π denotes the radius of each of the plurality of gear teeth 340a, 340b, 340c, 340d, 340e, 340f, and 340g.

In addition, a distance gb between the second protrusion 36b and the second gear 34b may be greater than a distance ga between the first protrusion 36a and the first gear 34a but smaller than a distance gc between the third protrusion 36c and the third gear 34c. A distance gd between the fourth protrusion 36d and the fourth gear 34d may be greater than the distance gc between the third protrusion 36c and the third gear 34c but smaller than a distance ge between the fifth protrusion 36e and fifth gear 34e. A distance gf between the sixth protrusion 36f and the sixth gear 34f may be greater than the distance ge between the fifth protrusion 36e and the fifth gear 34e but smaller than a distance gg between the seventh protrusion 36g and seventh gear 34g. That is, a distance between the protrusion and the gear may increase away from the drive pulley 33.

A maximum distance between the protrusion and the gear may be formed between a twenty-fifth gear 34y (see FIG. 12), which is adjacent to the driven pulley 35 (see FIG. 12), and a protrusion adjacent to the twenty-fifth gear. A sum of πR/2, which is the length of the protrusion, and the maximum distance may be smaller than a distance L between the centers of adjacent gears. The distance L may be greater than or equal to a width W of the plate.

Referring to FIGS. 15 and 16, when the drive pulley 33 rotates in a counterclockwise direction CCW, the protrusion may move closer to the gear to mesh with the gear. Accordingly, the plurality of gears 34a, 34b, 34c, 34d, 34e, 34f, and 34g and the plurality of plates 31a, 31b, 31c, 31d, 31e, 31f, and 31g may be rotated sequentially by the plurality of protrusions 36a, 36b, 36c, 36d, 36e, 36f, and 36g. The sequential rotation pattern may be changed by adjusting the distance between the above protrusions and gears. In other words, by movement of the belt 36, a rotation amount of a gear, which is relatively close to the drive pulley 33, among the plurality of gears 34a, 34b, 34c, 34d, 34e, 34f, and 34g may be greater than a rotation amount of a gear which is relatively far from the drive pulley 33, and a difference in the rotation amounts may be changed by adjusting the distance between the above protrusions and gears.

For example, the distance between the protrusion and the gear may increase away from the drive pulley 33. In this case, the plurality of plates 31a, 31b, 31c, 31d, 31e, 31f, and 31g may rotate sequentially from a plate closest to the drive pulley 33 to a plate farthest therefrom, and may rotate at the same time in some section. That is, a start point of rotation of a plate that is relatively far from the drive pulley 33 (e.g., second plate 31b) may be before an end point of rotation of a plate that is relatively close to the drive pulley 33 (e.g., first plate 31a).

Alternatively, the plurality of plates 31a, 31b, 31c, 31d, 31e, 31f, and 31g may rotate sequentially one by one from a plate closest to the drive pulley 33 to a plate farthest therefrom. In another example, a distance between the protrusion and the gear may be constant regardless of the distance from the drive pulley 33. In this case, the plurality of plates 31a, 31b, 31c, 31d, 31e, 31f, and 31g may be simultaneously rotated by the same angle.

Meanwhile, the above description of some of the plates 31a, 31b, 31c, 31d, 31e, 31f, 31g, 31h, 31i, 31j, 31k, 31l, 31m, 31n, 31o, 31p, 31q, 31r, 31s, 31t, 31u, 31v, 31w, 31x, and 31y, the gears 34a, 34b, 34c, 34d, 34e, 34f, 34g, 34h, 34i, 34j, 34k, 34l, 34m, 34n, 34o, 34p, 34q, 34r, 34s, 34t, 34u, 34v, 34w, 34x, and 34y, and the protrusions 36a, 36b, 36c, 36d, 36e, 36f, 36g, 36h, 36i, 36j, 36k, 36l, 36m, 36n, 36o, 36p, 36q, 36r, 36s, 36t, 36u, 36v, 36w, 36x, 36y of the blind assembly may also apply to the rest.

Referring to FIG. 17, the first gear 34a may be closest to the drive pulley 33, and the twenty-fifth gear 34y may closest to the driven pulley 35. An intermediate gear 34z may be disposed between the first gear 34a and the twenty-fifth gear 34y, and may be any one of the second to twenty-fourth gears 34b, 34c, 34d, 34e, 34f, 34g, 34h, 34i, 34j, 34k, 34l, 34m, 34n, 34o, 34p, 34q, 34r, 34s, 34t, 34u, 34v, 34w, and 34x.

For example, first gear teeth 340a' of the first gear 34a may be finer than gear teeth 340z of the intermediate gear 34z. In addition, a first protrusion 36a' that meshes with the first gear 34a may be finer than an intermediate protrusion 36z that meshes with the intermediate gear 34z, thereby allowing smooth engagement between the first gear 34a and the first protrusion 36a', where engagement between the protrusions and the gears begins in response to a counter-clockwise rotation of the drive pulley 33.

For example, twenty-fifth gear teeth 340y' of the twenty-fifth gear 34y may be finer than the gear teeth 340z of the intermediate gear 34z. Further, a twenty-fifth protrusion 36y' that meshes with the twenty-fifth gear 34y may be finer than the intermediate protrusion 36z that meshes with the intermediate gear 34z, thereby allowing smooth engagement between the twenty-fifth gear 34y and the twenty-fifth protrusion 36y', where engagement between the protrusions and the gears begins in response to a clockwise rotation of the drive pulley 33.

In addition, the first gear teeth 340a' of the first gear 34a and the twenty-fifth gear teeth 340y' of the twenty-fifth gear 34y may have the same shape, and the first protrusion 36a' and the twenty-fifth protrusion 36y' may have the same shape.

Referring to FIG. 18, a sum of widths of the plurality of plates 31a, 31b, 31c, 31d, 31e, 31f, 31g, 31h, 31i, 31j, 31k, 31l, 31m, 31n, 31o, 31p, 31q, 31r, 31s, 31t, 31u, 31v, 31w, 31x, and 31y may be substantially equal to a distance L1 between the left part 22 and the right part 23.

That is, when angles of the plurality of plates 31a, 31b, 31c, 31d, 31e, 31f, 31g, 31h, 31i, 31j, 31k, 31l, 31m, 31n, 31o, 31p, 31q, 31r, 31s, 31t, 31u, 31v, 31w, 31x, and 31y are zero degrees (see FIGS. 18 and 22), the rear side of the display panel 11 may be opened rearward through the plurality of plates 31a, 31b, 31c, 31d, 31e, 31f, 31g, 31h, 31i, 31j, 31k, 31l, 31m, 31n, 31o, 31p, 31q, 31r, 31s, 31t, 31u, 31v, 31w, 31x, and 31y.

In addition, when angles of the plurality of plates 31a, 31b, 31c, 31d, 31e, 31f, 31g, 31h, 31i, 31j, 31k, 31l, 31m, 31n, 31o, 31p, 31q, 31r, 31s, 31t, 31u, 31v, 31w, 31x, and 31y are 90 degrees (see FIG. 25), the rear side of the display panel 11 may be covered by the plurality of plates 31a, 31b, 31c, 31d, 31e, 31f, 31g, 31h, 31i, 31j, 31k, 31l, 31m, 31n, 31o, 31p, 31q, 31r, 31s, 31t, 31u, 31v, 31w, 31x, and 31y.

Meanwhile, considering the function of the plates that open and close the display panel 11, the widths of the plates may increase as the number of plates provided for the display device decreases. In other words, as the number of plates provided for the display device decreases, the widths of the plates may decrease and a total width t1 of the display device may decrease.

Meanwhile, as the width of the plates decreases, the plates that open the rear side of the display panel 11 may be less visible to a user in front of the display 10.

Referring to FIGS. 10 and 19, a first magnet 21m and a second magnet 21n may be positioned in the vicinity of the bottom hole 21h. Alternatively, the first magnet 21m and the second magnet 21n may be formed in the vicinity of the top hole 24h (see FIG. 11), or may be formed in the vicinity of the bottom hole 21h and the top hole 24, respectively.

The first magnet 21m may be disposed between the bottom hole 21h and the display panel 11. The second magnet 21n may be separated from the first magnet 21m by 90 degrees with respect to the bottom hole 21h. The first magnet 21m and the second magnet 21n may form a group, and each group may be formed in the vicinity of each of a plurality of bottom holes 21h.

The plate 31 may include a magnetic substance such as iron (Fe). If an angle of the plate 31 is zero degrees (see the solid line), the lower side of the plate 31 may be magnetically coupled to the first magnet 21m. When the plate 31 rotates counterclockwise by 90 degrees (see the dotted line), the lower side of the plate 31 may be magnetically coupled to the second magnet 21n.

Accordingly, the first magnet 21m or the second magnet 21n may fix the position of the plate 31.

Referring to FIGS. 20 and 21, the plate 31 may have a parallelogram cross-section. If angles of the plates 31 are 90 degrees (see FIG. 21), a portion of any one of adjacent plates 31 may overlap back and forth with a portion of another one.

Accordingly, if angles of the plates 31 are 90 degrees, a user in front of the display 10 may not recognize gaps between the plates 31.

Referring to FIGS. 22 to 25, the plurality of plates 31 may open and close the rear side of the display panel 11.

Referring to FIGS. 22 to 25 in sequential order, as the drive pulley 33 (see FIG. 14) rotates counterclockwise, the plurality of plates 31 may rotate sequentially from zero to 90 degrees in a direction from the left part 22 toward the right part 23. In addition, the rear side of the display panel 11 may also be closed sequentially in the direction from the left part 22 toward the right part 23.

Referring to FIGS. 22 to 25 in reverse order, as the drive pulley 33 (see FIG. 14) rotates clockwise, the plurality of plates 31 may rotate sequentially from 90 to zero degrees in a direction from the right part 23 toward the left part 22. In addition, the rear side of the display panel 11 may also be closed sequentially in the direction from the right part 23 toward the left part 22.

Referring to FIGS. 26 and 27, the controller 110 (see FIG. 2) of the display device may be electrically connected to the motor 32 (see FIG. 13) and the sensor 39b (see FIG. 13) described above. The controller 110 may detect a rotation direction and a rotation angle of the motor 32 based on information acquired from the motor 32 and the sensor 39b (S10). Here, the rotation direction and rotation angle of the motor 32 may be the same as the rotation direction and rotation angle of the drive pulley 33 (see FIG. 13) described above.

After operation S10, the controller 110 may determine whether angles of the plates 31 are 0 degrees (S11). In this case, if the angles of the plates 31 are zero degrees, the rear side of the display 10 is opened rearward through the plates 31, and if the angles of the plates 31 are 90 degrees, the rear side of the display 10 is closed by the plates 31.

Upon determining in operation S11 that the angles of the plates 31 are zero degrees (Yes in S11), the controller 110 may determine that a mode of the display 10 is a light transmitting mode (S12, see the top view of FIG. 26). For example, the display 10 may not display an image, and a user in front of the display 10 may see the rear side of the display 10 through the plates 31. In another example, the display 10 may display an image, and a user in front of the display 10 may see the image and the rear side of the display 10.

In this case, a first side of each of the plates 31 facing the display 10 may be painted in white, and vertical stripes of the plates 31 may be less visible to the user in front of the display 10. Alternatively, the one side may be painted in other colors.

Upon determining in operation S11 that the angles of the plates 31 are 90 degrees (No in S11), the controller 110 may determine that a mode of the display 10 is a light blocking mode (S13, see the bottom view of FIG. 26). The display 10 may or may not display an image, and the user in front of the display 10 may not see the rear side of the display 10.

In this case, a second side of each of the plates 31 facing the display 10 may be painted in black, thereby enhancing color contrast in an image on the display 10. Alternatively, the second side may be painted in other colors.

Referring to FIGS. 28 and 29, a single protrusion 360 may be formed in an inner circumferential surface of the belt 36. By the movement of the belt 36, the single protrusion 360 may sequentially mesh with the plurality of gear teeth 340a, 340b, 340c, 340d, 340e, 340f, and 340g of the plurality of gears 34a, 34b, 34c, 34d, 34e, 34f, and 34g.

Accordingly, the plurality of plates 31a, 31b, 31c, 31d, 31e, 31f, and 31g may rotate sequentially one by one, from a plate closest to the drive pulley 33 to a plate farthest therefrom.

Referring to FIG. 29 from top to bottom, as the drive pulley 33 (see FIG. 28) rotates counterclockwise, the plurality of plates 31 may rotate in a stepwise manner from 0 to 90 degrees in a direction from the left part 22 toward the right part 23. In addition, the rear side of the display panel 11 may also be closed in a stepwise manner in the direction from the left part 22 toward the right part 23.

Referring to FIG. 29 from bottom to top, as the drive pulley 33 (see FIG. 28) rotates clockwise, the plurality of plates 31 may rotate in a stepwise manner from 90 to 0 degrees in a direction from the right part 23 toward the left part 22. In addition, the rear side of the display panel 11 may also be opened in a stepwise manner in the direction from the right part 23 toward the left part 22.

Referring to FIGS. 29 and 30, the controller 110 (see FIG. 2) of the display device may be electrically connected to the motor 32 (see FIG. 13) and the sensor 39b (see FIG. 13) described above. The controller 110 may detect a rotation direction and a rotation angle of the motor 32 based on information acquired from the motor 32 and the sensor 39b (S20). Here, the rotation direction and rotation angle of the motor 32 may be the same as the rotation direction and rotation angle of the drive pulley 33 (see FIG. 13) described above.

After operation S20, the controller 110 may determine whether angles of all the plates 31 are zero degrees (S21). In this case, if the angles of all the plates 31 are zero degrees, the rear side of the display 10 is opened rearward through the plates 31.

Upon determining in operation S21 that the angles of all the plates 31 are zero degrees (Yes in S21), the controller 110 may determine that a mode of the display 10 is a light transmitting mode (S22, see the top view of FIG. 29). For example, the display 10 may not display an image, and a user in front of the display 10 may see the rear side of the display 10 through the plates 31. In another example, the display 10 may display an image, and a user in front of the display 10 may see the image and the rear side of the display 10.

Upon determining in operation S21 that the angles of all the plates 31 are not zero degrees (No in S21), the controller 110 may determine whether the angles of all the plates 31 are 90 degrees (S23). In this case, if the angles of all the plates 31 are 90 degrees, the rear side of the display 10 is covered by the plates 31.

Upon determining in operation S23 that the angles of all the plates 31 are 90 degrees (Yes in S23), the controller 110 may determine that a mode of the display 10 is a light blocking mode (S24, see the bottom view of FIG. 29). The display 10 may or may not display an image, and the user in front of the display 10 may not see the rear side of the display 10.

Upon determining in S23 that angles of some of the plates 31 are zero degrees while angles of the others are 90 degrees (No in S23), the controller 110 may determine that a mode of the display 10 is a partial light blocking mode (S25, see the middle view of FIG. 29).

Referring to FIGS. 31 to 33, in the partial light blocking mode (S25), the controller 110 may detect the position of each of the plates 31 based on information acquired from the motor 32 (see FIG. 13) and the sensor 39b (see FIG. 13), and may detect a transparent region SA and a light blocking region SB (S251). The angles of the plates 31 are zero degrees in the transparent region SA, and the angles of the plates 31 are 90 degrees in the light blocking region SB.

In the case where an image is output only to the transparent region SA (Yes in S252), the controller 110 may enhance visibility of the image, output to the transparent region SA, in response to a request from a user. For example, in order to enhance visibility of the image, the controller 110 may increase brightness, contrast, sharpness, and the like of the image compared to a standard image. Here, the standard image is an image with brightness, contrast, sharpness, and the like which are set based on the light blocking region SB. Accordingly, the visibility of the image output to the transparent region SA may be enhanced.

If the image is output only to the light blocking region SB (Yes in S254), the controller 110 may output the standard image to the light blocking region (S255).

If an image is segmented and output to the transparent region SA and the light blocking region SB (Yes in S257), the controller 110 may enhance visibility of the image output to the transparent region SA, while outputting the standard image to the light blocking region SB (S258, see FIG. 32). For example, in order to enhance the visibility of the image in the transparent region SA, the controller 110 may increase the brightness, contrast, sharpness, and the like of the image compared to the standard image in the light blocking region SB, thereby reducing the sense of difference between the image in the transparent region SA and the image in the light blocking region SB. Meanwhile, in the case (not shown) where the same image is output to each of the transparent region SA and the light blocking region SB, a controlling method such as operation S258 may be performed.

In the case where different images are output to each of the transparent region SA and the light blocking region SB (No in S257), the controller 110 may enhance the visibility of the image output in the transparent region SA in response to a request from a user, while outputting the standard image to the light blocking region SB (S259, see FIG. 33). For example, in order to enhance the visibility of the image in the transparent region SA, the controller 110 may increase the brightness, contrast, sharpness, and the like of the image compared to the standard image in the light blocking region SB. Accordingly, the user may enhance the visibility of the image in the transparent region SA, or may not enhance the visibility of the image in the light blocking region SB. For example, the image in the transparent region SA may be a real-time chat window linked in the image of the light blocking region SB.

Referring to FIGS. 34 to 39, a drive pulley 33' may include a fixed conical plate 331, a movable conical plate 332, and a shaft 333. The cone of the fixed conical plate 331 may face the movable conical plate 332, and the cone of the movable conical plate 332 may face the fixed conical plate 331. The shaft 333 may protrude from the cone of the fixed conical plate 331 toward the movable conical plate 332 and may pass through the movable conical plate 332.

The fixed conical plate 331 and the movable conical plate 332 may be fixed to the rotating shaft 32a, and may rotate together with the rotating shaft 32a. In addition, the movable conical plate 332 may be coupled to the shaft 333 so as to be movable in a longitudinal direction of the shaft 333. For example, a power member, such as a linear actuator, may allow the movable conical plate 332 to rectilinearly reciprocate.

A driven pulley 35' may include a fixed conical plate 351, a movable conical plate 352, and a shaft 353. The cone of the fixed conical plate 351 may face the movable conical plate 352, and the cone of the movable conical plate 352 may face the fixed conical plate 351. The shaft 353 may protrude from the cone of the fixed conical plate 351 toward the movable conical plate 352 and may pass through the movable conical plate 352.

The movable conical plate 352 may be coupled to the shaft 353 so as to be movable in a longitudinal direction of the shaft 353. For example, a power member 37, such as a linear actuator, may allow the movable conical plate 352 to rectilinearly reciprocate.

A belt 36' may span between the fixed conical plate 331 and 351 and the movable conical plate 332 and 352. The belt 36' may mesh with the drive pulley 33' and the driven pulley 35'. The belt 36' may be a V-belt.

For example, referring to FIGS. 34 to 36, the movable conical plate 332 and 352 may be positioned closest to the fixed conical plate 331 and 351, and a minimum distance D10 may be formed between the movable conical plate 332 and 352 and the fixed conical plate 331 and 351. The belt 36' may be stretched between a conical surface of the movable conical plate 332 and 352 and a conical surface of the fixed conical plate 331 and 351, and may have a maximum radius R10 and R20 with respect to the shaft 333.

For example, referring to FIGS. 37 to 39, the movable conical plate 332 and 352 may be positioned farthest from the fixed conical plate 331 and 351, and a maximum distance D11 may be formed between the movable conical plate 332 and 352 and the fixed conical plate 331 and 351. The belt 36' may be stretched between a conical surface of the movable conical plate 332 and 352 and a conical surface of the fixed conical plate 331 and 351, and may have a minimum radius R11 and R21 with respect to the shaft 333.

Accordingly, the drive pulley 33' and the driven pulley 35' may be referred to as variable diameter pulleys. Meanwhile, the variable diameter pulleys may also be implemented using mechanisms different from the above.

Referring to FIGS. 40 to 42, a first gear 34a' may be positioned closest to the drive pulley 33', and a twenty-fifth gear 34y' may be positioned closest to the driven pulley 35'. An intermediate gear 34z' may be disposed between the first gear 34a' and the twenty-fifth gear 34y', and may be any one of second to twenty-fourth gears 34b', 34c', 34d', 34e', 34f, 34g', 34h', 34i', 34j', 34k', 34l', 34m', 34n', 34o', 34p', 34q', 34r', 34s', 34t', 34u', 34v', 34w', and 34x'.

A first sync gear teeth 340aa may be formed on an outer circumferential surface of the first gear 34a' and may be adjacent to the first gear teeth 340a. The first sync gear teeth 340aa may be located within a certain angle range (e.g., 90 degrees) in a circumferential direction of the first gear 34a'. The first sync gear teeth 340aa may have a shape that meshes with a portion of the belt 36' (i.e., the inner circumferential surface of the belt 36') that meshes with the drive pulley 33' and the driven pulley 35'.

An intermediate sync gear teeth 340zz may be formed on an outer circumferential surface of the intermediate gear 34z' and may be adjacent to the intermediate gear teeth 340z. The intermediate sync gear teeth 340zz may be located within a certain angle range (e.g., 90 degrees) in a circumferential direction of the intermediate gear 34z'. The intermediate sync gear teeth 340zz may have a shape that meshes with a portion of the belt 36' (i.e., inner circumferential surface of the belt 36') that meshes with the drive pulley 33' and the driven pulley 35'

A twenty-fifth sync gear teeth 340yy may be formed on an outer circumferential surface of the twenty-fifth gear 34y' and may be adjacent to the twenty-fifth gear teeth 340y. The twenty-fifth sync gear teeth 340$yy$ may be located within a certain angle range (e.g., 90 degrees) in a circumferential direction of the twenty-fifth gear 34$y'$. The twenty-fifth sync gear teeth 340$yy$ may have a shape that meshes with a portion of the belt 36' (i.e., inner circumferential surface of the belt 36') that meshes with the drive pulley 33' and the driven pulley 35'

Referring to FIG. 40, angles of all the plates 31$a$, 31$z$, and 31$y$ may be 90 degrees, and the radius R10 and R20 of the belt 36' with respect to the shaft 333 and 353 may be maximum. In this case, the first sync gear teeth 340$aa$, the intermediate sync gear teeth 340$zz$, and the twenty-fifth sync gear teeth 340$yy$ may be spaced apart from the belt 36'. In this state, when the drive pulley 33' rotates clockwise, the twenty-fifth plate 31$y$, the intermediate plate 31$z$, and the first plate 31$a$ may sequentially rotate from 90 to 0 degrees.

Referring to FIG. 41, the radius R11 and R21 of the belt 36' with respect to the shaft 333 and 353 may be minimum. In this case, the first sync gear teeth 340$aa$, the intermediate sync gear teeth 340$zz$, and the twenty-fifth sync gear teeth 340$yy$ may contact the belt 36'.

Referring to FIG. 42, when the drive pulley 33' rotates counterclockwise, all the plates 31$a$, 31$z$, and 31$y$ may rotate as the sync gear teeth 340$aa$, 340$zz$, and 340$yy$ mesh with the belt 36'. Accordingly, all the plates 31$a$, 31$z$, and 31$y$ may simultaneously rotate from 90 to 180 degrees. In this state, when the drive pulley 33' rotates clockwise, all the plates 31$a$, 31$z$, and 31$y$ may simultaneously rotate from 180 to 90 degrees.

Meanwhile, in FIG. 40, a distance g10 between the twenty-fifth protrusion 36$y$ and the driven pulley 35' may be greater than lengths of the sync gear teeth 340$aa$, 340$zz$, and 340$yy$. Accordingly, while the sync gear teeth 340$aa$, 340$zz$, and 340$yy$ mesh with the belt 36', the twenty-fifth protrusion 36$y$ may not contact the driven pulley 35'.

Meanwhile, in FIGS. 41 and 42, cut-outs 340$aaa$, 340$zzz$, and 340$yyy$ may be formed in outer circumferential surfaces of the gears 34$a'$, 34$z'$, and 34$y'$, and may be opposite to the sync gear teeth 340$aa$, 340$zz$, and 340$yy$ with respect to the gear teeth 340$a$, 340$z$, and 340$y$. Accordingly, while the sync gear teeth 340$aa$, 340$zz$, and 340$yy$ mesh with the belt 36', the protrusions 36$a$, 36$z$, and 36$y$ may not contact the gears 34$a'$, 34$z'$, and 34$y'$.

Referring to FIGS. 43 and 44 in sequential order, the plurality of plates 31 may simultaneously rotate from 90 to 180 degrees, and may open the rear side of the display panel 11.

Referring to FIGS. 43 and 44 in reverse order, the plurality of plates 31 may simultaneously rotate from 180 to 90 degrees, and may close the rear side of the display panel 11.

Referring to FIGS. 1 to 44, a display device according to an embodiment of the present disclosure may include: a display panel having a light emitting region and a transparent region; a plurality of plates positioned behind the display panel, extending in a first direction, and sequentially arranged in a second direction; and a side frame extending along a periphery of the display panel and to which each of the plurality of plates is coupled so as to be rotatable about a rotation axis that is parallel to the first direction, wherein the plurality of plates sequentially rotate in the second direction and open or close a rear of the display panel, wherein the plurality of plates may include: a first plate; and a second plate spaced apart from the first plate in the second direction, wherein a start point of rotation of the second plate may be before an end point of rotation of the first plate.

The rear of the display panel may be opened through a space between the plurality of plates when a thickness direction of the plurality of plates is aligned with the second direction, and the rear of the display panel may be closed by the plurality of plates when the thickness direction of the plurality of plates is aligned with a direction intersecting the first direction and the second direction.

Each of the plurality of plates may have a parallelogram cross-section, and when the rear of the display panel is closed, a portion of any one of the plurality of plates may overlap back and forth with a portion of another one.

The display device may further include: a motor; and a plurality of gears receiving power from the motor, wherein each of the plurality of gears may be fixed to the rotation axis of each of the plurality of plates, and may sequentially rotate in the second direction.

The display device may further include: a drive pulley fixed to a rotating shaft of the motor; a driven pulley opposite to the drive pulley with respect to the plurality of gears; a belt engaged with the drive pulley and the driven pulley; and a plurality of protrusions formed at an inner circumferential surface of the belt, arranged alternately with the plurality of gears, and having a shape engaged with the plurality of gears.

A gap between the protrusion and the gear may increase away from the drive pulley.

The plurality of gears may include: a first gear closest to the driven pulley; and a second gear opposite to the driven pulley with respect to the first gear, wherein the plurality of protrusions may include a first protrusion disposed between the second gear and the first gear, and wherein a distance between a center of the first gear and a center of the second gear may be greater than or equal to a sum of a length of the first protrusion and a gap between the first protrusion and the first gear.

Among the plurality of gears, a gear closest to the drive pulley and a gear closest to the driven pulley may have finer gear teeth than other gears.

Each of the plurality of gears may include gear teeth formed at an outer circumferential surface of each of the plurality of gears, and located within a certain angle range in a circumferential direction of each of the plurality of gears, wherein a length of each of the plurality of protrusions may be substantially equal to a length of the gear teeth of each of the plurality of gears.

The drive pulley and the driven pulley may be variable diameter pulleys, wherein each of the plurality of gears may include sync gear teeth formed at an outer circumferential surface of each of the plurality of gears, located within a certain angle range in a circumferential direction of each of the plurality of gears, and next to the gear teeth, wherein the sync gear teeth has a shape engaged with the inner circumferential surface of the belt, wherein when a radius of the belt with respect to a center of the variable diameter pulley is at maximum, the sync gear teeth may be separated from the inner circumferential surface of the belt, and when the radius of the belt with respect to the center of the variable diameter pulley is at minimum, the sync gear teeth may contact the inner circumferential surface of the belt.

Each of the plurality of gears may further include a cut-out formed at an outer circumferential surface of each of the plurality of gears, and opposite to the sync gear teeth with respect to the gear teeth.

The side frame may include: a top part and a bottom part which are opposite to each other in the first direction; and a left part and a right part which are opposite to each other in the second direction, wherein each of the plurality of plates may include: a top pin protruding from one end of the plate toward the top part, and rotatably coupled to the top part; and a bottom pin protruding from another end of the plate toward the bottom part, rotatably coupled to the bottom part, and passing through the bottom part, wherein each of the plurality of gears may be fixed to a distal end of the bottom pin of each of the plurality of plates.

The display device may further include a first magnet and a second magnet which are disposed inside the top part or inside the bottom part, the first magnet and the second magnet positioned near the bottom pin or the top pin, wherein the plate may include a magnetic substance, and the first magnet and the second magnet may be spaced apart from each other by 90 degrees with respect to the bottom pin or the top pin.

The display device may further include: a housing disposed under the display panel; and a driving module disposed in an inner space of the housing and rotating the plurality of plates.

The display device may further include: a sensor detecting rotation angles of the plurality of plates; and a controller determining a light transmitting mode or a light blocking mode of the display panel based on information acquired form the sensor, wherein when the display panel displays an image in the light transmitting mode, the controller may output the image while enhancing visibility of the image.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A display device comprising:
   a display panel having a light emitting region and a transparent region;
   a plurality of plates positioned behind the display panel, extending in a first direction, and sequentially arranged in a second direction;
   a side frame extending along a periphery of the display panel and to which each of the plurality of plates is coupled so as to be rotatable about a rotation axis that is parallel to the first direction;
   a motor;
   a drive pulley fixed to a rotating shaft of the motor;
   a plurality of gears which are fixed to the rotation axes of the plurality of plates, respectively, and which sequentially rotates in the second direction;
   a driven pulley opposite to the drive pulley with respect to the plurality of gears;
   a belt engaged with the drive pulley and the driven pulley; and
   a plurality of protrusions formed at an inner circumferential surface of the belt, arranged alternately with the plurality of gears, and having a shape engaged with the plurality of gears,
   wherein the plurality of plates sequentially rotate in the second direction and open or close a rear of the display panel,
   wherein the plurality of plates comprise:
   a first plate; and
   a second plate spaced apart from the first plate in the second direction, and
   wherein a start point of rotation of the second plate is before an end point of rotation of the first plate.

2. The display device of claim 1, wherein the rear of the display panel is opened through a space between the plurality of plates when a thickness direction of the plurality of plates is aligned with the second direction, and the rear of the display panel is closed by the plurality of plates when the thickness direction of the plurality of plates is aligned with a direction intersecting the first direction and the second direction.

3. The display device of claim 2, wherein each of the plurality of plates has a parallelogram cross-section, and when the rear of the display panel is closed, a portion of any one of the plurality of plates overlaps back and forth with a portion of another one.

4. The display device of claim 1, wherein a gap between the protrusion and the gear increases away from the drive pulley.

5. The display device of claim 4, wherein the plurality of gears comprise:
   a first gear closest to the driven pulley; and
   a second gear opposite to the driven pulley with respect to the first gear,
   wherein the plurality of protrusions comprise a first protrusion disposed between the second gear and the first gear, and
   wherein a distance between a center of the first gear and a center of the second gear is greater than or equal to a sum of a length of the first protrusion and a gap between the first protrusion and the first gear.

6. The display device of claim 4, wherein, among the plurality of gears, a gear closest to the drive pulley and a gear closest to the driven pulley have finer gear teeth than other gears.

7. The display device of claim 4, wherein each of the plurality of gears comprise gear teeth formed at an outer circumferential surface of each of the plurality of gears, and located within a certain angle range in a circumferential direction of each of the plurality of gears, and
   wherein a length of each of the plurality of protrusions is substantially equal to a length of the gear teeth of each of the plurality of gears.

8. The display device of claim 7, wherein the drive pulley and the driven pulley are variable diameter pulleys,
   wherein each of the plurality of gears comprise sync gear teeth formed at an outer circumferential surface of each of the plurality of gears, located within a certain angle range in a circumferential direction of each of the plurality of gears, and next to the gear teeth,
   wherein the sync gear teeth has a shape engaged with the inner circumferential surface of the belt, and
   wherein when a radius of the belt with respect to a center of the variable diameter pulley is at maximum, the sync gear teeth are separated from the inner circumferential surface of the belt, and when the radius of the belt with respect to the center of the variable diameter pulley is at minimum, the sync gear teeth contact the inner circumferential surface of the belt.

9. The display device of claim 8, wherein each of the plurality of gears further comprises a cut-out formed at an outer circumferential surface of each of the plurality of gears, and opposite to the sync gear teeth with respect to the gear teeth.

10. The display device of claim 1, wherein the side frame comprises:
- a top part and a bottom part which are opposite to each other in the first direction; and
- a left part and a right part which are opposite to each other in the second direction, wherein each of the plurality of plates comprises:
- a top pin protruding from one end of the plate toward the top part, and rotatably coupled to the top part; and
- a bottom pin protruding from another end of the plate toward the bottom part, rotatably coupled to the bottom part, and passing through the bottom part, and wherein each of the plurality of gears is fixed to a distal end of the bottom pin of each of the plurality of plates.

11. The display device of claim 10, further comprising a first magnet and a second magnet which are disposed inside the top part or inside the bottom part, the first magnet and the second magnet positioned near the bottom pin or the top pin,
- wherein the plate comprises a magnetic substance, and
- wherein the first magnet and the second magnet are spaced apart from each other by 90 degrees with respect to the bottom pin or the top pin.

12. The display device of claim 1, further comprising:
- a housing disposed under the display panel; and
- a driving module disposed in an inner space of the housing and rotating the plurality of plates.

13. The display device of claim 1, further comprising:
- a sensor detecting rotation angles of the plurality of plates; and
- a controller determining a light transmitting mode or a light blocking mode of the display panel based on information acquired form the sensor, wherein when the display panel displays an image in the light transmitting mode, the controller outputs the image while enhancing visibility of the image.

\* \* \* \* \*